United States Patent
Kim et al.

(10) Patent No.: US 8,406,291 B2
(45) Date of Patent: Mar. 26, 2013

(54) METHOD, MEDIUM, AND APPARATUS FOR ENCODING AND/OR DECODING VIDEO

(75) Inventors: Dae-hee Kim, Suwon-si (KR); Dae-sung Cho, Seoul (KR); Woong-il Choi, Hwaseong-si (KR); Hyun-mun Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1200 days.

(21) Appl. No.: 12/285,690

(22) Filed: Oct. 10, 2008

(65) Prior Publication Data

US 2009/0097549 A1 Apr. 16, 2009

(30) Foreign Application Priority Data

Oct. 11, 2007 (KR) .................. 10-2007-0102811

(51) Int. Cl.
*H04N 21/00* (2011.01)
(52) U.S. Cl. .................................. 375/240.02
(58) Field of Classification Search .................. None
See application file for complete search history.

(56) References Cited

U.S. PATENT DOCUMENTS

| | | | | |
|---|---|---|---|---|
| 2005/0117641 A1* | 6/2005 | Xu et al. | .................. | 375/240.08 |
| 2005/0259729 A1 | 11/2005 | Sun | .............. | 375/240.1 |
| 2006/0197777 A1 | 9/2006 | Cha | ................ | 345/600 |

FOREIGN PATENT DOCUMENTS

| | | |
|---|---|---|
| WO | 2005/094081 | 10/2005 |
| WO | 2007/027001 | 3/2007 |

OTHER PUBLICATIONS

International Search Report and Written Opinion, mailed Apr. 10, 2009, in corresponding PCT Application No. PCT/KR2008/005973 (11 pp.).
European Search Report dated Nov. 18, 2011 issued in corresponding European Patent Application No. 08837335.2.
Peter Amon et al., "SNR Scalable Layered Video Coding", International Workshop on Packet Video, Apr. 2004, pp. 1-8.
Peter D. Symes, "Ten-Bit Processing in an 8-Bit Environment", SMPTE Journal, Jun. 1989, pp. 444-446.
"Joint Draft 8: Scalable Video Coding", Draft of the Joint Video Team of the ISO/IEC, Nov. 2006, pp. 58-59.
Martin Winken et al., "Bit-depth Scalable Video Coding", ICIP 2007, pp. I-5-I-8.
SMPTE Technology Committee C24 on Video Compression Technology, "Proposed SMPTE Standard for Television: VC-1 Compressed Video Bitstream Format and Decoding Process", Aug. 2005, pp. i-xx, 1-480.

* cited by examiner

*Primary Examiner* — Gilberto Barron, Jr.
*Assistant Examiner* — Izunna Okeke
(74) *Attorney, Agent, or Firm* — Staas & Halsey LLP

(57) ABSTRACT

A method, medium, and apparatus for encoding and/or decoding video by generating a scalable bitstream formed with a base layer bitstream and an enhancement layer bitstream in order to provide forward compatibility, the scalable bitstream comprising a base layer bitstream including a base quantized level and a base quantization parameter corresponding to a base bit-depth, and an enhancement layer bitstream including a residue between an extended quantized level and a compensated quantized level that is predicted from the base quantized level, and additional quantization information for refining the difference between an extended bit-depth and the base bit-depth, wherein a process for improving image quality is applied to at least one of the base layer and the enhancement layer.

25 Claims, 15 Drawing Sheets

METHOD, MEDIUM, AND APPARATUS FOR ENCODING AND/OR DECODING VIDEO

CROSS-REFERENCE TO RELATED PATENT APPLICATIONS

This application claims the benefit of Korean Patent Application No. 10-2007-0102811, filed on Oct. 11, 2007, in the Korean Intellectual Property Office, the disclosure of which is incorporated herein in its entirety by reference.

BACKGROUND

1. Field

One or more embodiments of the present invention relates to a video encoding apparatus and method and a video decoding apparatus and method, and more particularly, to a video encoding apparatus and method and a video decoding apparatus and method in which a scalable bitstream supporting at least one encoding parameter from among at least two bit-depths and at least two video formats, and having forward compatibility, is generated or decoded.

2. Description of the Related Art

In an ordinary video codec according to conventional technology, when the bit-depth of a basic encoder such as a VC-1 encoder, is changed from 8 bits to 10 bits, or when the video format of a basic encoder is simply changed from 4:2:0 to 4:2:2 or 4:4:4, it is impossible for a VC-1 decoder to read and reproduce a bitstream which is generated by the improved encoders having the extended bit-depth or the changed video format. Recently, the necessity for development of a video codec which guarantees forward compatibility and allows a VC-1 decoder and other improved decoders to restore a bitstream encoded with a variety of bit-depths or video formats, as well as a fixed bit-depth or fixed video format, has been increasingly highlighted.

That is, since a new video codec, which does not guarantee forward compatibility, cannot support a terminal having only a conventional basic video codec, reuse of digital content in both terminals having specifications that are different from each other becomes impossible. In addition, it will take much time for the new video codec to settle into the market, because the new video codec needs to overcome the already established conventional video codec market.

SUMMARY

One or more embodiments of the present invention provides a video encoding apparatus and method in which a scalable bitstream formed with a base layer bitstream and an enhancement layer bitstream is generated so that the scalable bitstream can support at least one encoding parameter from among at least two bit-depths and at least two video formats supporting forward compatibility and can improve image quality.

One or more embodiments of the present invention also provides a video decoding apparatus and method in which a scalable bitstream formed with a base layer bitstream and an enhancement layer bitstream is decoded so that the scalable bitstream can support at least one encoding parameter from among at least two bit-depths and at least two video formats supporting forward compatibility can improve image quality.

Additional aspects and/or advantages will be set forth in part in the description which follows and, in part, will be apparent from the description, or may be learned by practice of the invention.

According to an aspect of the present invention, there is provided a video encoding method of generating a scalable bitstream supporting at least two bit-depths with forward compatibility, wherein the scalable bitstream comprises: a base layer bitstream including a base quantized level and a base quantization parameter corresponding to a base bit-depth; and an enhancement layer bitstream including a residue between an extended quantized level and a compensated quantized level that is predicted from the base quantized level, and additional quantization information for refining the difference between an extended bit-depth and the base bit-depth, wherein a process for improving image quality is performed on at least one of a base layer and an enhancement layer.

According to another aspect of the present invention, there is provided a video encoding apparatus for generating a scalable bitstream supporting at least two bit-depths with forward compatibility, the video encoding apparatus comprising: a base layer encoding unit to generate a base layer bitstream including a base quantized level and a base quantization parameter corresponding to a base bit-depth; and an enhancement layer encoding unit to generate an enhancement layer bitstream including a residue between an extended quantized level and a compensated quantized level that is predicted from the base quantized level, and additional quantization information for refining the difference between an extended bit-depth and the base bit-depth, wherein a process for improving image quality is performed on at least one of a base layer and an enhancement layer.

According to another aspect of the present invention, there is provided a video decoding method of decoding a scalable bitstream including a base layer bitstream and an enhancement layer bitstream, in which a process for improving image quality is performed on at least one of a base layer and an enhancement layer, the video decoding method comprising: decoding the base layer bitstream including a base quantized level and a base quantization parameter corresponding to a base bit-depth and to obtain a base restoration image; and decoding the enhancement layer bitstream including a residue between an extended quantized level and a compensated quantized level that is predicted from the base quantized level, and additional quantization information for refining the difference between an extended bit-depth and the base bit-depth, and to obtain an extended restoration image by adding a compensated quantized level predicted from a restored base quantized level to a restored extended quantized level.

According to another aspect of the present invention, there is provided a video decoding apparatus for decoding a scalable bitstream including a base layer bitstream and an enhancement layer bitstream, in which a process for improving image quality is performed on at least one of a base layer and an enhancement layer, the video decoding apparatus comprising: a base layer decoding unit to decode the base layer bitstream including a base quantized level and a base quantization parameter corresponding to a base bit-depth and to obtain a base restoration image; and an enhancement layer decoding unit to decode the enhancement layer bitstream including a residue between an extended quantized level and a compensated quantized level that is predicted from the base quantized level, and additional quantization information for refining the difference between an extended bit-depth and the base bit-depth, and to obtain an extended restoration image by adding a compensated quantized level predicted from a restored base quantized level to a restored extended quantized level.

According to another aspect of the present invention, there is provided a computer readable medium having computer readable code to implement a video encoding method of generating a scalable bitstream supporting at least two bit-depths with forward compatibility, wherein the scalable bitstream comprises: a base layer bitstream including a base quantized level and a base quantization parameter corresponding to a base bit-depth; and an enhancement layer bitstream including a residue between an extended quantized level and a compensated quantized level that is predicted from the base quantized level, and additional quantization information for refining the difference between an extended bit-depth and the base bit-depth, wherein a process for improving image quality is performed on at least one of a base layer and an enhancement layer.

According to another aspect of the present invention, there is provided a computer readable medium having computer readable code to implement a video decoding method of decoding a scalable bitstream including a base layer bitstream and an enhancement layer bitstream, in which a process for improving image quality is performed on at least one of a base layer and an enhancement layer, the video decoding method comprising: decoding the base layer bitstream including a base quantized level and a base quantization parameter corresponding to a base bit-depth and to obtain a base restoration image; and decoding the enhancement layer bitstream including a residue between an extended quantized level and a compensated quantized level that is predicted from the base quantized level, and additional quantization information for refining the difference between an extended bit-depth and the base bit-depth, and to obtain an extended restoration image by adding a compensated quantized level predicted from a restored base quantized level to a restored extended quantized level.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
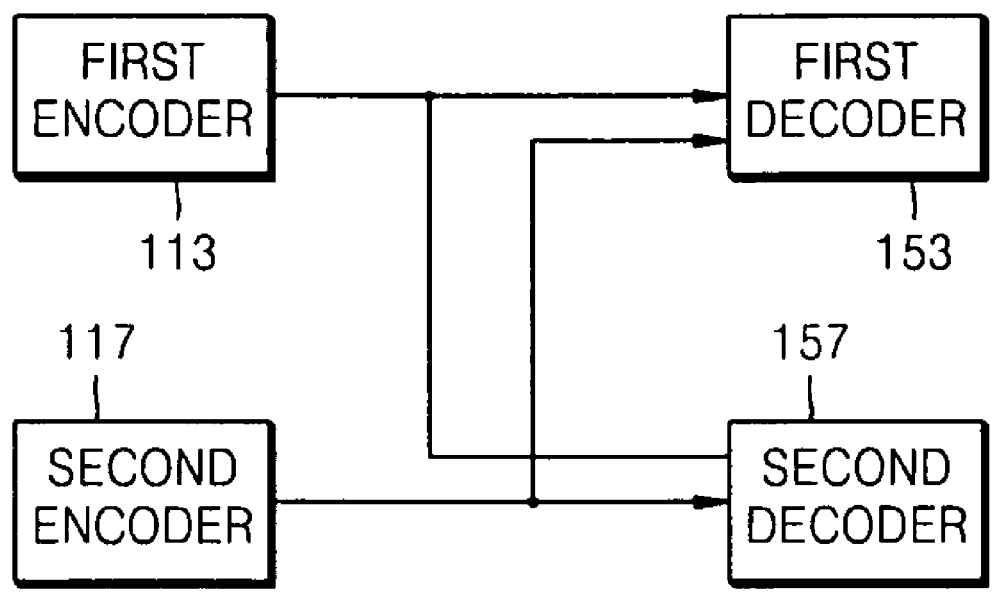
FIG. 1 is a block diagram for explaining the concept of a video encoding apparatus and a video decoding apparatus according to an embodiment of the present invention.

Reference will now be made in detail to embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a block diagram for explaining the concept of a video encoding apparatus and a video decoding apparatus according to an embodiment of the present invention. As an encoder part, examples of a first encoder 113 performing the role of a basic encoder and a second encoder 117 performing the role of an improved encoder will be explained. As a decoder part, examples of a first decoder 153 performing the role of a basic decoder and corresponding to the first encoder 113, and a second decoder 157 performing the role of an improved decoder and corresponding to the second encoder 117 will be explained. In an embodiment of the present invention, the first encoder 113 generates a bitstream according to a base bit-depth and a first video format, and the second encoder 117 generates a scalable bitstream supporting the base bit-depth and an extended bit-depth and complying with the first video format. In another embodiment of the present invention, the first encoder 113 generates a bitstream according to the base bit-depth and the first video format, and the second encoder 117 generates a scalable bitstream supporting the first video format and a second video format and complying with the base bit-depth. In still another embodiment of the present invention, the first encoder 113 generates a bitstream according to the base bit-depth and the first video format, and the second encoder 117 generates a scalable bitstream supporting the base bit-depth and the extended bit-depth, and the first and second video formats, or a scalable bitstream supporting the base bit-depth and the extended bit-depth and the first video format and a third video format. That is, the second encoder 117 generates a scalable bitstream which can support forward compatibility with at least one from among encoding parameters including bit-depths and video formats, and corresponding to this, the second decoder 157 decodes a scalable bitstream or a non-scalable bitstream.

For convenience of explanation, an example will be given, in which a base bit-depth is 8 bits, an extended bit-depth is 10 bits, a first video format is 4:2:0, a second video format is 4:2:2, and a third video format is 4:4:4. According to the example, a VC-1 encoder supporting an 8-bit bit-depth and a 4:2:0 video format may be employed as the first encoder 113.

Referring to FIG. 1, a bitstream 131 generated in the first encoder 113 can be decoded in the second decoder 157 as well as in the first decoder 153. A scalable bitstream 137 generated by the second encoder 117 can be decoded by the second decoder 157. In the first decoder 153, a base layer bitstream in the scalable bitstream 137 can be decoded in a state in which an enhancement layer bitstream included in the scalable bitstream 137 is ignored. The second encoder 117, which is capable of providing this forward compatibility, corresponds to a scalable video encoding apparatus of the present invention, while the second decoder 157 corresponds to a scalable video decoding apparatus of the present invention.

First, a process of obtaining a scalable bitstream by extending a bit-depth among encoding parameters will now be explained with reference to FIG. 1.

In an example in which the first encoder 113 is an 8-bit encoder and the second encoder 117 is an N-bit encoder, a start code of a picture level of an enhancement layer bitstream in a scalable bitstream obtained from the second encoder 117 is used in order to express a remaining part of an extended bit-depth which the first encoder 113 cannot express. First, when the extended bit-depth is N bits, the extended quantization parameter is referred to as $QP_N$ and when the base bit-depth is 8 bits, the base quantization parameter is referred to as $QP_8$. If an original image whose bit-depth is N bits is encoded in a video codec whose bit-depth is 8 bits, the relationship between the two quantization parameters is as given by Equation 1 below.

$$QP_N = QP_8 \times 2^{(N-8)} \quad (1)$$

That is, the dynamic range of the result obtained by quantizing the N-bit original image with the extended quantization parameter $QP_N$ should be the same as the dynamic range of the result obtained by quantizing the base quantization parameter $QP_8$. By making the dynamic ranges identical, without any particular change in the video codecs, the N-bit original image can be encoded and decoded in the conventional method. However, in this case, the quality of an image restored from the N-bit original image is not any different from the quality of an image restored from an 8-bit original image, and therefore the advantage of the N-bit original image is lost.

In order to improve this, in the case of an N-bit original image, it can be expressed as given by Equation 2 below, by using a base quantization parameter $QP_8$, and a refined quantization parameter (R) which is an embodiment of additional quantization information. In this case, the extended quantization parameter $QP_N$ or the base quantization parameter $QP_8$ is derived from 'PQINDEX' in the case of a VC-1 encoder. By using the refined quantization parameter (R), a smaller extended quantization parameter than the base quantization parameter can be permitted.

$$QP_N = QP_8 \times 2^{(N-8)} + R \quad (2)$$

In an embodiment, R has a value in a range [−3, 0]. In this case, if $QP_8$ has a value in a range [1, 31], $QP_N$ has a value in a range [1, $2^{(N-8)} \times 31$]. That is, if a base quantization parameter $QP_8$ is given in relation to a refined quantization parameter (R) having a predetermined range, an extended quantization parameter $QP_N$ and the refined quantization parameter (R) can be calculated. In this case, although the minimum values of the base quantization parameter $QP_8$ and the extended quantization parameter $QP_N$ are identical and equal to 1, a high contrast ratio can be provided by using a relatively smaller value for the extended quantization parameter $QP_N$.

The data obtained by quantizing the N-bit original image by using the quantization parameter of Equation 1 forms a base layer bitstream, and the data obtained by quantizing the N-bit original image by using the quantization parameter of Equation 2 forms an enhancement layer bitstream, and by combining the two bitstreams, a scalable bitstream is generated. In this case, in order to reduce the amount of data which is transmitted as an enhancement layer bitstream, an enhancement layer bitstream can be formed from a quantized level which is predicted from a quantized level used for a base layer bitstream. This scalable bitstream can be decoded both by an N-bit decoder as well as by a conventional 8-bit decoder.

A process of obtaining a scalable bitstream by extending a video format among encoding parameters will now be explained with reference to FIG. 1.

When the video formats of the first encoder 113 and the second encoder 117 are different from each other, a concept of spatial scalability is applied to form a scalable bitstream. For example, when the video format supported by the first encoder 113 and the first decoder 153 is 4:2:0 and the video format supported by the second encoder 117 and the second decoder 157 is 4:2:2, filtering of a chrominance component in a 4:2:2 image is performed, thereby dividing the chrominance component into a low frequency band value and a high frequency band value. Then, by using the chrominance component of the low frequency band value, a 4:2:0 image is reconstructed with a luminance component. Meanwhile, without performing the filtering, a 4:2:0 image can be reconstructed by performing down-sampling of a chrominance component. The reconstructed 4:2:0 image is encoded in, for example, a 4:2:0 video encoder such as the first encoder 113, included in the second encoder 117, and forms a base layer bitstream as 4:2:0 compression data. Meanwhile, in the 4:2:2 video encoder included in the second encoder 117, a chrominance image formed by the chrominance component of the high frequency band value is encoded, thereby forming an enhancement layer bitstream. As another example, when the video format supported by the first encoder 113 and the first decoder 153 is 4:2:0 and the video format supported by the second encoder 153 and the second decoder 157 is 4:4:4, the same principle is also applied. When a base layer bitstream and an enhancement layer bitstream are generated, a coded block pattern (CBP) may be encoded together with the base layer bitstream and the enhancement layer bitstream. The CBP which is used when a base layer bitstream is generated is formed by 6 bits for a 4:2:0 video format, 8 bits for a 4:2:2 video format, and 12 bits for a 4:4:4 video format. Meanwhile, a CBP which is used when an enhancement layer bitstream is generated is formed by 2 bits for a 4:2:2 video format and 4 bits for a 4:4:4 video format, because an encoding process is performed in relation to only a chrominance image.

Figure 2:
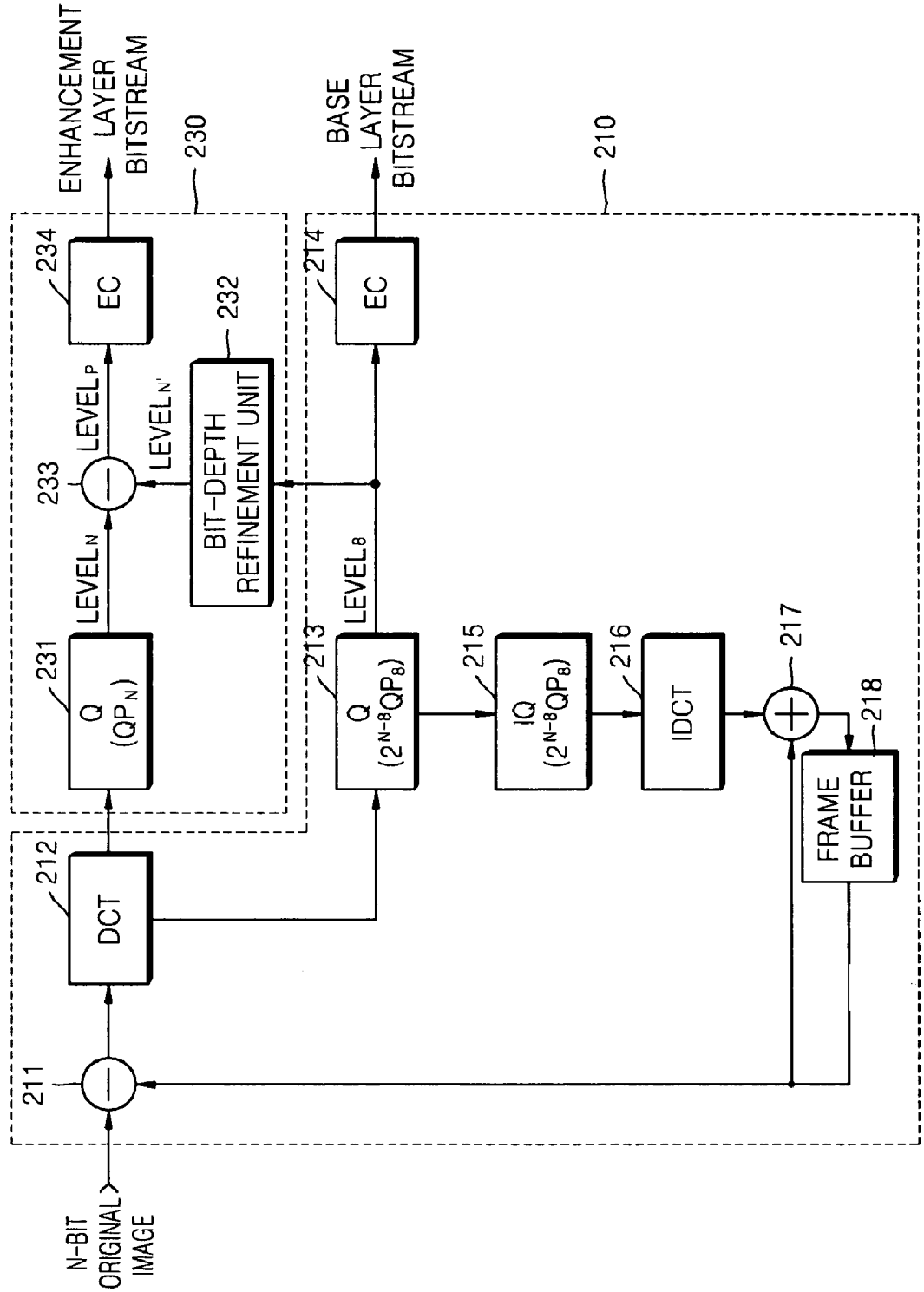
FIG. 2 is a block diagram illustrating a video encoding apparatus according to an embodiment of the present invention.

FIG. 2 is a block diagram illustrating a video encoding apparatus according to an embodiment of the present invention. The video encoding apparatus may include a first base layer encoding module 210 and a first enhancement layer encoding module 230. The first base layer encoding module 210 may include a subtraction unit 211, a DCT unit 212, a quantization unit 213, an entropy encoding unit 214, an inverse quantization unit 215, an inverse DCT unit 216, an addition unit 217, and a frame buffer 218. The first enhancement layer encoding module 230 may include a quantization unit 231, a bit-depth refinement unit 232, a subtraction unit 233, and an entropy encoding unit 234. Each element of the first base layer encoding module 210 and the first enhancement layer encoding module 230 can be implemented as at least one processor (not shown). Alternatively, the first base layer encoding module 210 and the first enhancement layer encoding module 230 may be integrated in order to implement one processor (not shown).

Referring to FIG. 2, in regard to the first base layer encoding module 210, the DCT unit 212 generates transform coefficients for a residue image between an N-bit restoration image which is obtained by temporal/spatial prediction of an N-bit reference image, and an N-bit original image. In other words, a loop formed of the subtraction unit 211, the DCT unit 212, the quantization unit 213, the inverse quantization unit 215, the inverse DCT unit 216, the addition unit 217, and the frame buffer 218 has the same structure as a general video codec.

The quantization unit 213 quantizes a transform coefficient provided by the DCT unit 212 with a quantization parameter ($2^{N-8}$ $QP_8$) obtained by multiplying a base quantization parameter ($QP_8$) by $2^{N-8}$ as shown in Equation 1. The entropy encoding unit 214 entropy-encodes the quantized transform coefficient, that is, a base quantized level ($LEVEL_8$), thereby generating a base layer bitstream. More specifically, assuming that the transform coefficient is coef, the base quantized level ($LEVEL_8$) can be expressed as given by Equation 3 below.

$$LEVEL_8 = \frac{abs(coef) + QP_8 \times 2^{(N-9)}}{QP_8 \times 2^{(N-8)}} \quad (3)$$

The base quantized level ($LEVEL_8$) obtained from Equation 3 is directly entropy-encoded so that it can be restored in a general 8-bit video codec, and then, the result is transmitted as a base layer.

Regarding the first enhancement layer encoding module 230, the quantization unit 231 quantizes the transform coefficient provided by the DCT unit 212 with the extended quantization parameter ($QP_N$) of Equation 2, and by entropy-encoding the quantized transform coefficient, that is, the extended quantized level, the quantization unit 231 generates an enhancement layer bitstream. More specifically, assuming that the transform coefficient is coef, the extended quantized level ($LEVEL_N$) can be expressed as given by Equation 4 below.

$$LEVEL_N = \frac{abs(coef) + QP_N/2}{QP_N} \quad (4)$$

The extended quantized level ($LEVEL_N$) obtained from Equation 4 is not directly entropy-encoded, but a residue of a quantized level obtained by performing prediction encoding with the base quantized level ($LEVEL_8$), that is, a predicted quantized level, is entropy-encoded. That is, since the base quantized level ($LEVEL_8$) is very similar to the extended quantized level ($LEVEL_N$), the difference between the base quantized level ($LEVEL_8$) and the extended quantized level ($LEVEL_N$) is obtained by the bit-depth refinement unit 232 and the subtraction unit 233, and is determined as a predicted quantized level. More specifically, the bit-depth refinement unit 232 refines the dynamic range of each quantized level, and outputs a refined quantized level ($LEVEL_N'$) by making the base quantized level ($LEVEL_8$) have the same dynamic range as that of the extended quantized level ($LEVEL_N$) according to Equation 5 below.

$$LEVEL_N' = \left\lfloor \frac{QP_8 \times 2^{(N-8)}}{QP_N} \times LEVEL_8 \right\rfloor \quad (5)$$

The subtraction unit 233 obtains the residue between the extended quantized level ($LEVEL_N$) and the refined quantized level ($LEVEL_N'$), and generates a predicted quantized level ($LEVEL_P$) as given by Equation 6 below.

$$LEVEL_P = LEVEL_N - LEVEL_N' \quad (6)$$

By the entropy encoding unit 234 entropy-encoding the predicted quantized level ($LEVEL_P$) and transmitting it as an enhancement layer, the amount of data included in the enhancement layer bitstream can be greatly reduced. Meanwhile, the enhancement layer bitstream further includes additional quantization information, which can be used to refine a difference between the base layer bit-depth and the enhancement layer bit-depth. Also, when a video format of the enhancement layer is different from a video format of the base layer, additional chrominance data that can support the video format of the enhancement layer is further included.

Figure 3A:
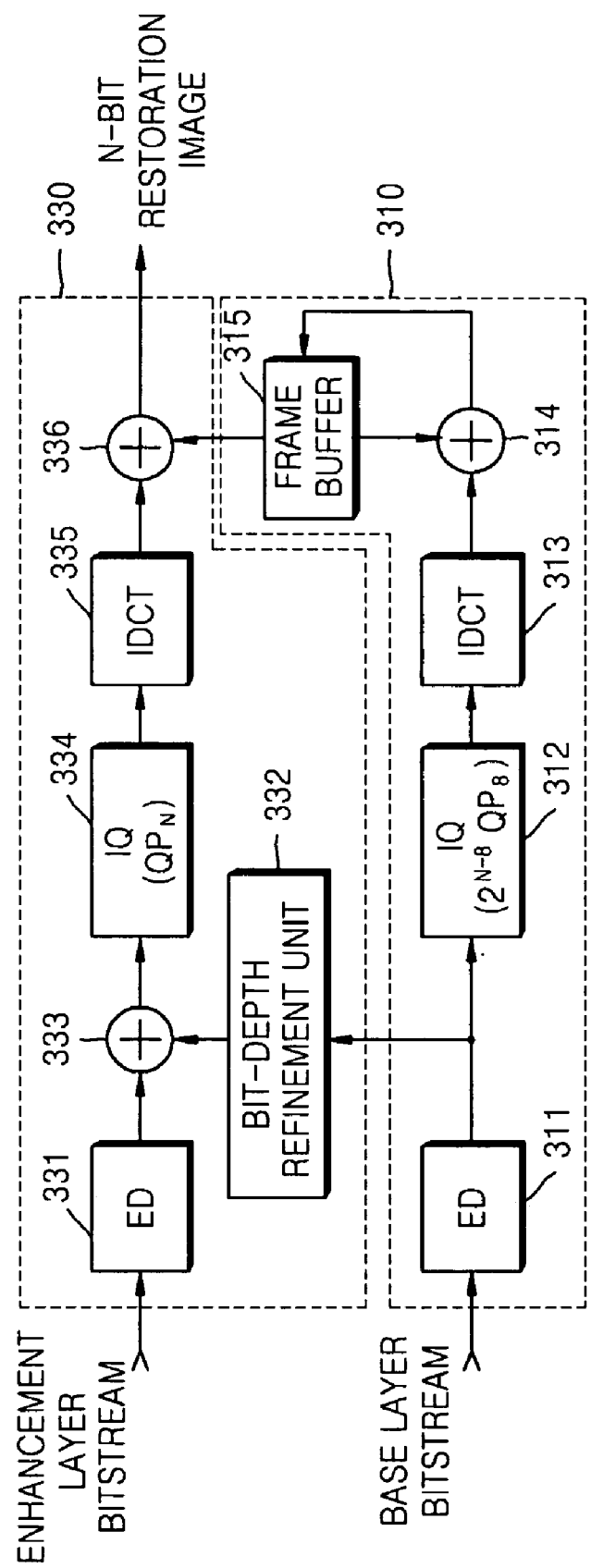
FIG. 3A is a block diagram illustrating a video decoding apparatus according to an embodiment of the present invention.

FIG. 3A is a block diagram illustrating a video decoding apparatus according to an embodiment of the present invention. The video decoding apparatus may include a first base layer decoding module 310 and a first enhancement layer decoding module 330, and corresponds to the video encoding apparatus illustrated in FIG. 2. The first base layer decoding module 310 may include an entropy decoding unit 311, an inverse quantization unit 312, an inverse DCT unit 313, an addition unit 314, and a frame buffer 315. The first enhancement layer decoding module 330 may include an entropy decoding unit 331, a bit-depth refinement unit 332, an addition unit 333, an inverse quantization unit 334, an inverse DCT unit 335, and an addition unit 336. Each element of the first base layer decoding module 310 and the first enhancement layer decoding module 330 can be implemented as at least one processor (not shown). Alternatively, the first base layer decoding module 310 and the first enhancement layer decoding module 330 may be integrated in order to implement one processor (not shown).

Referring to FIG. 3A, when a received bitstream is a scalable bitstream including an enhancement layer identifier, a bitstream input unit (not shown) pre-separates the scalable bitstream into a base layer bitstream and an enhancement layer bitstream and respectively provides the base layer bitstream and the enhancement layer bitstream to the entropy decoding unit 311 and the entropy decoding unit 331. When the received bitstream is a non-scalable bitstream that does not include an enhancement layer identifier, the bitstream input unit provides the received bitstream to the entropy decoding unit 311, and sets a quantization parameter of the inverse quantization unit 312 to $QP_8$.

In regard to the first base layer decoding module 310, the base layer bitstream is decoded through the entropy decoding unit 311, the inverse quantization unit 312, the inverse DCT unit 313, the addition unit 314, and the frame buffer 315, thereby generating an N-bit restoration image. The generated N-bit restoration image is stored in the frame buffer 315, and is used as a reference image not only while decoding the base layer bitstream but also while decoding the enhancement layer bitstream. Alternatively, when the non-scalable bitstream is inputted, the addition unit 314 generates an 8-bit restoration image which is then stored in the frame buffer 315.

In the first enhancement layer decoding module 330, the inputted enhancement layer bitstream is entropy-decoded in the entropy decoding unit 331, thereby restoring a predicted quantized level ($LEVEL_P$). The bit-depth refinement unit 332 refines the bit-depth of the base quantized level ($LEVEL_8$) restored in the entropy decoding unit 311, and generates a refined quantized level ($LEVEL_N'$)). The addition unit 333 adds the predicted quantized level ($LEVEL_P$) and the refined quantized level (LEVEL$_N$')) as illustrated in Equation 7 below, and thus generates an extended quantized level (LEVEL$_N$).

$$LEVEL_N = LEVEL_P + LEVEL_N' \qquad (7)$$

The inverse quantization unit 334 performs inverse-quantization of the extended quantized level (LEVEL$_N$) with the extended quantization parameter (QP$_N$) as illustrated in Equation 8 below, thereby restoring a transform coefficient (coef$_N$).

$$coef_N = LEVEL_N \times QP_N \qquad (8)$$

The inverse DCT unit 335 performs inverse transform of the restored transform coefficient (coef$_N$), thereby restoring a residue. The addition unit 336 adds the N-bit reference image stored in the frame buffer (315) to the restored residue image, thereby generating a final N-bit restoration image.

Here, the extended quantization parameter (QP$_N$) may be obtained from the base quantization parameter (QP$_8$) restored from the base layer bitstream and an additional quantization information restored from the enhancement layer bitstream, such as a refined quantization parameter (R).

Figure 3B:
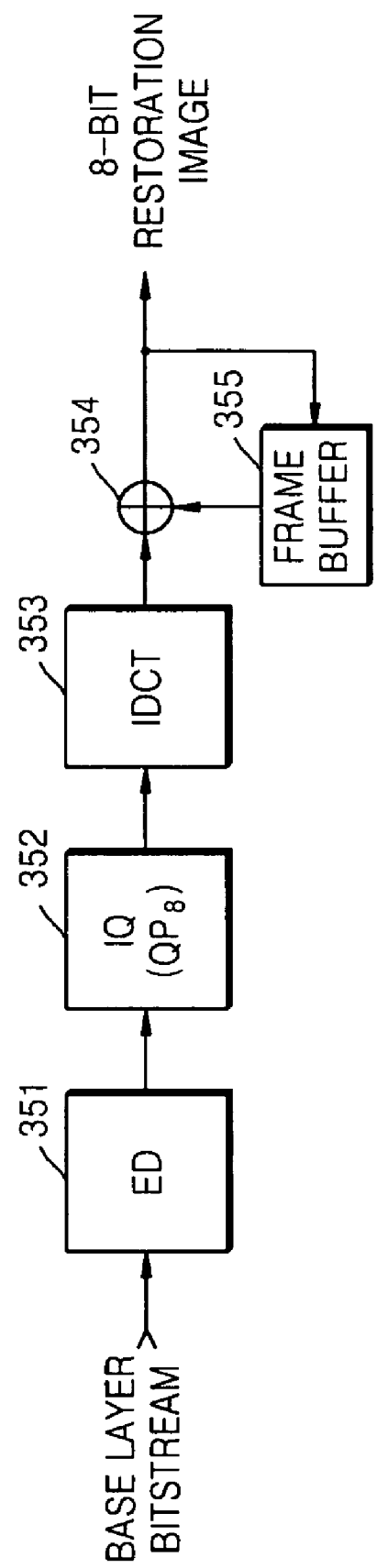
FIG. 3B is a block diagram illustrating a general video decoding apparatus, to which a scalable bitstream generated by the apparatus of FIG. 2 is input.

FIG. 3B is a block diagram illustrating a general video decoding apparatus, to which a scalable bitstream generated by the apparatus of FIG. 2 is input. The general video decoding apparatus includes an entropy decoding unit 351, an inverse quantization unit 352, an inverse DCT unit 353, an addition unit 354, and a frame buffer 355. The general video decoding apparatus of FIG. 3B has the same structure as the first base layer decoding module 310 illustrated in FIG. 3A, except for an inverse quantization parameter used during an inverse quantization process.

Referring to FIG. 3B, a bitstream input unit (not shown) determines whether an inputted bitstream includes an enhancement layer identifier, and if the inputted bitstream is a scalable bitstream, separates a base layer bitstream from the scalable bitstream and provides the base layer bitstream to the entropy decoding unit 351.

The entropy decoding unit 351 restores a base quantization parameter (QP$_8$) by decoding the inputted base layer bitstream.

The inverse quantization unit 352 restores a transform coefficient (coef$_8$) from the base layer bitstream by using a base quantization parameter (QP$_8$) as given by Equation 9 below.

$$coef_8 = LEVEL_8 \times QP_8 \qquad (9)$$

The inverse DCT unit 353 performs inverse transform on the restored transform coefficient (coef$_8$), thereby restoring a residue, and the addition unit 354 adds the 8-bit reference image stored in the frame buffer 355 to the restored residue image, thereby generating a final 8-bit restoration image.

Meanwhile, a scalable bitstream obtained from a video encoding apparatus of the present invention is constructed by combining a base layer bitstream generated through a first base layer encoding module 210 and a first enhancement layer bitstream generated through an enhancement layer encoding module 230. Basically, a sequence header (Base SEQ_HDDR) of a lower layer, i.e., a base layer, is located before a sequence header (Enhancement SEQ_HDDR) of an upper layer, i.e., an enhancement layer. A frame or picture header (Base PIC_HDDR) of a base layer and frame or picture data (Base PIC_DATA) of a base layer are respectively located after the sequence header of each layer, and then, a frame or picture header (Enhancement PIC_HDDR) of an enhancement layer and frame or picture data (Enhancement PIC_DATA) are respectively located. In this case, the frame or picture header and frame or picture data of each layer repeatedly appear up to the last frame or picture included in one video sequence. In the scalable bitstream according to the present invention, a variety of user data or entry-point information or group of pictures (GOP) information may be further included in a predetermined location. Meanwhile, in another embodiment, an enhancement layer may be located before a base layer in relation to a frame or picture header. Here, a sequence header (Base SEQ_HDDR), a frame or picture header (Base PIC_HDDR), a frame or picture header (Base PIC_HDDR) and frame or picture data (Base PIC_DATA) of a base layer forming a base layer bitstream are substantially the same as in the ordinary video codecs.

Table 1 below explains areas for loading information related to an enhancement layer, including an enhancement layer identifier, in a scalable bitstream obtained from a video encoding apparatus according to the present invention. When the first encoder 113 is a VC-1 encoder, a start code of 4 bytes may be used in an embodiment of the present invention. In the case of the VC-1 encoder, a start code can be supported from an advanced profile or higher. Meanwhile, a start code may be included in the first area of a header of each level.

TABLE 1

| Start-CODE Suffix | BDU Type |
| --- | --- |
| 0x00 | SMPTE Reserved |
| 0x01-0x09 | SMPTE Reserved |
| 0x0A | end-of-Sequence |
| 0x0B | Slice |
| 0x0C | Field |
| 0x0D | Frame |
| 0x0E | Entry-point Header |
| 0x0F | Sequence Header |
| 0x10-0x1A | SMPTE Reserved |
| 0x1B | Slice Level User Data |
| 0x1C | Field Level User Data |
| 0x1D | Frame Level User Data |
| 0x1E | Entry-point Level User Data |
| 0x1F | Sequence Level User Data |
| 0x20-40, 0x41-0x7F | SMPTE Reserved |
| 0x80-0xFF | Forbidden |

Referring to table 1, a process of loading information related to an enhancement layer in a start code of the VC-1 used in an embodiment of the present invention will now be explained. Among bitstream data unit (BDU) types defined in a suffix in a start code, reserved areas reserved for future use are used for loading information related to the enhancement layer. Here, the BDU means a compression data unit that can be parsed independently of other information items in an identical layer level. For example, the BDU may be a sequence header, an entry point header, an encoded picture or a slice. Among the BDU types defined in the suffix of the start code, the remaining areas excluding a forbidden area are for loading information related to a base layer. Here, the start code is only an example, and other parts in the elements of a bitstream may also be used. Here, it is assumed that '0x00' is a first reserved area, '0x01-0x09' is a second reserved area, '0x10-0x1A' is a third reserved area, and '0x20-0x40' is a fourth reserved area.

Meanwhile, an enhancement layer includes a sequence level, a GOP level, a frame level, a field level, and a slice level. According to an embodiment of the present invention, information of the enhancement layer may be included in one of the second reserved area and the fourth reserved area. More specifically, a start code is included in a header for a sequence level of the enhancement layer as '0x09' in the second reserved area or '0x40' in the fourth reserved area. A start code is included in a header for a GOP level of the enhancement layer as '0x08' in the second reserved area or '0x3F' in the fourth reserved area. A start code is included in a header for a frame level of the enhancement layer as '0x07' in the second reserved area or '0x3E' in the fourth reserved area. A start code is included in a header for a field level of the enhancement layer as '0x06' in the second reserved area or '0x3D' in the fourth reserved area. A start code for enhancement chrominance data is included in a header for enhancement layer data as '0x06' in the second reserved area or '0x3C' in the fourth reserved area.

This will now be explained in more detail.

Examples of Information items that can be included in the start code of the header for the enhancement layer sequence level which is defined as '0x09' in the second reserved area include information on an additional profile and level that can be achieved by the enhancement layer in addition to a base layer, and information on a bit-depth. More specifically, in the sequence level of the base layer, a profile is defined by 2 bits, '3' indicates an advanced profile and '0-2' indicates a reserved area. Meanwhile, a level is defined by 3 bits, '000' indicates AP@L0, '001' indicates AP@L1, '010' indicates AP@L2, '011' indicates AP@L3, '100' indicates AP@L4, and '101-111' indicates a reserved area. Information on a bit-depth that can be achieved by the enhancement layer can be expressed by a value from "N−8" (where N is the bit-depth of the enhancement layer). According to the bit-depth of the first encoder 113 illustrated in FIG. 1 corresponding to the base layer, a value other than 8 can be used. Meanwhile, N may be used without any change as bit-depth information that can be achieved by an enhancement layer. Also, enhanced video format information may be included as information on an enhancement layer. The video format information may be expressed by using a variable included in the sequence level of the base layer, for example, in the case of the VC-1 encoder, a 'COLORDIFF' variable may be used. Also, the video format information may be included as '0x09' in the second reserved area. That is, when the video format of an enhancement layer is not enhanced or when a variable of a base layer is utilized for an extended video format, the enhancement layer does not have to separately transmit enhanced video format information. In the example of the 'COLORDIFF' variable, '1' is used for defining a 4:2:0 video format, and '2' and '3' are specified as reserved areas. Accordingly, the variable can be used for defining a 4:2:2 video format and a 4:4:4 video format. Meanwhile, an additional hypothetical reference decoder (HRD) variable may be included as information on the enhancement layer. The HRD variable is a virtual video buffer variable which a decoder refers to for operating a buffer.

When a bit-depth or a video format does not change in units of GOPs, the start code of the header for the enhancement layer GOP level which is defined as '0x08' in the second reserved area is not necessary, and is designated as a reserved area. When the bit-depth or video format is changed in units of GOPs, the start code is necessary.

The start code for the header of the picture level, i.e., a frame level and a field level, of the enhancement layer which is defined as '0x07' and '0x06' in the second reserved area, includes additional information to indicate the bit-depth of an enhancement layer together with the bit-depth information of a base layer according to progressive or interlaced scanning. In an embodiment of the present invention, the start code includes a value of an additional quantization parameter corresponding to 'N−8' (where N is the bit-depth of the second encoder 117) when the bit-depth of the first encoder 113 is 8 bits. In this case, since an additional quantization parameter is used in units of pictures, the additional quantization parameter is included in the picture level. However, in other embodiments of the present invention, when an additional quantization parameter is used in units of slices, the additional quantization parameter is included in the slice level, when an additional quantization parameter is used in units of macroblocks, the additional quantization parameter is included in the macroblock level, and when an additional quantization parameter is used in units of blocks, the additional quantization parameter is included in the block level. In order to calculate an additional quantization parameter for each slice, macroblock or block, a process for calculating an additional quantization parameter of a picture level which will be explained later can be applied.

When the video format of the enhancement layer is not changed in comparison with the base layer, the start code for the header of the enhancement layer data which is defined as '0x05' in the second reserved area is not necessary, and therefore is designated as a reserved area. That is, when the video formats of the base layer and the enhancement layer are identically 4:2:0, data for 4 luminance blocks and 2 chrominance blocks forming one macroblock for a base layer is transmitted in the base layer, and data which is predicted by using the 4 luminance blocks and 2 chrominance blocks forming one macroblock for the base layer is transmitted in the enhancement layer. Meanwhile, when the video formats of the base layer and the enhancement layer are different from each other, for example, when the video format of the base layer is 4:2:0 and the video format of the enhancement layer is 4:2:2 or when the video format of the base layer is 4:2:0 and the video format of the enhancement layer is 4:4:4, data for 4 luminance blocks and 2 chrominance blocks for the base layer are transmitted in the base layer, and in the enhancement layer, additional data on a chrominance component is transmitted together with the data predicted by using the 4 luminance blocks and 2 chrominance blocks forming one macroblock for the base layer so that the changed video format can be supported.

Meanwhile, information related to the enhancement layer is not restricted to the start codes described in table 1, and can be included in a reserved area which is reserved for future use in a sequence level, a GOP level, a picture level, a macroblock level or a block level. Also, an enhancement layer identifier can be included in a variety of ways in a variety of layers of a network protocol or a system layer for loading and packaging a video bitstream as a payload in order to transmit the bitstream.

Figure 4:
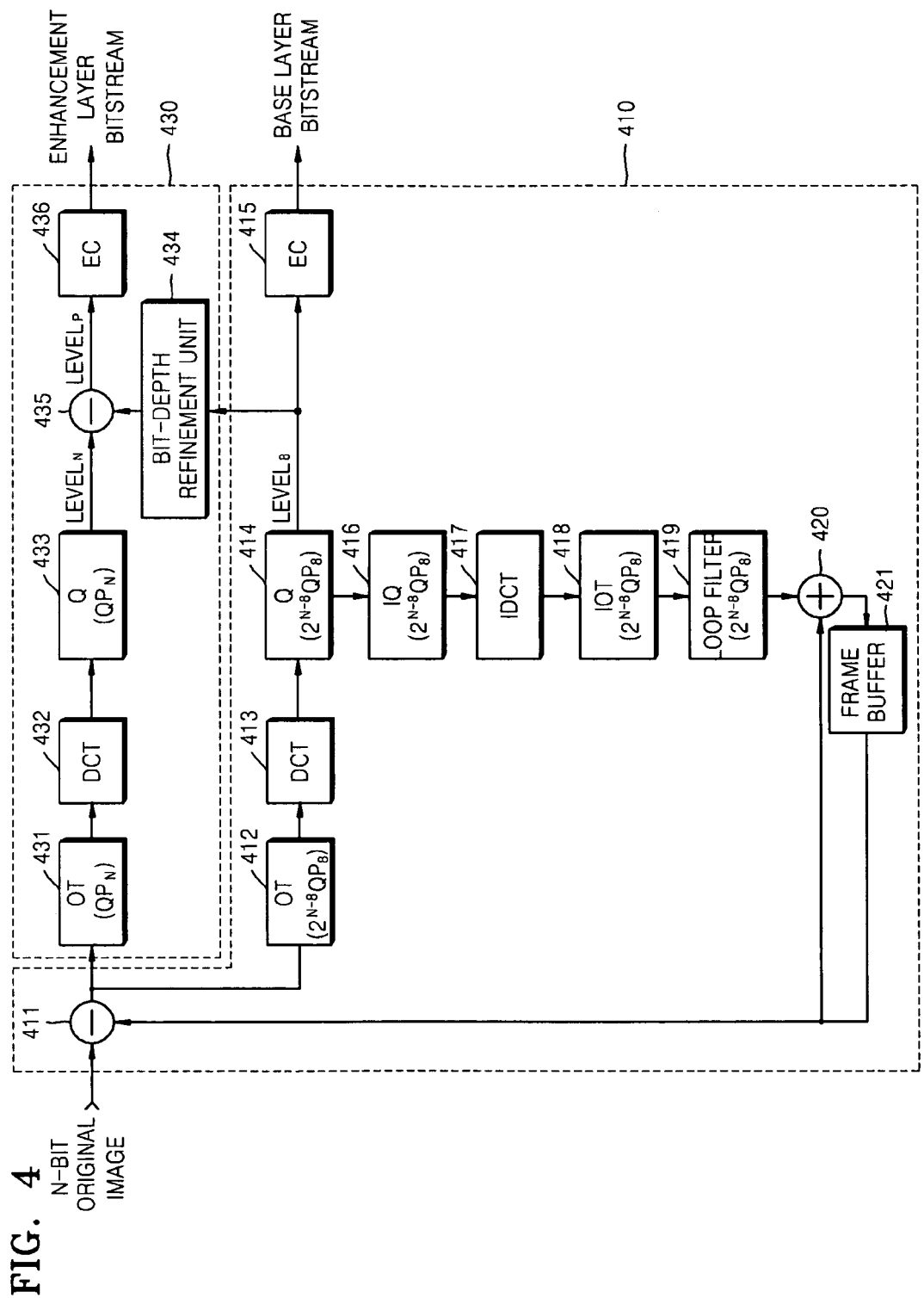
FIG. 4 is a block diagram illustrating a video encoding apparatus according to another embodiment of the present invention.

FIG. 4 is a block diagram illustrating a video encoding apparatus according to another embodiment of the present invention. The video encoding apparatus may include a second base layer encoding module 410 and a second enhancement layer encoding module 430. The second base layer encoding module 410 may include a subtraction unit 411, an overlap transform unit 412, a DCT unit 413, a quantization unit 414, an entropy encoding unit 415, an inverse quantization unit 416, an inverse DCT unit 417, an inverse overlap transform unit 418, a loop filter 419, an addition unit 420, and a frame buffer 421. The second enhancement layer encoding module 430 may include an overlap transform unit 431, a DCT unit 432, a quantization unit 433, a bit-depth refinement unit 434, a subtraction unit 435, and an entropy encoding unit 436. Each element of the second base layer encoding module 410 and the second enhancement layer encoding module 430 can be implemented as at least one processor (not shown) by integrating each module into at least one module. Alternatively, the second base layer encoding module 410 and the second enhancement layer encoding module 430 may be integrated in order to implement one processor (not shown). The video encoding apparatus of FIG. 4 and the video encoding apparatus of FIG. 2 have the same structure, except that the second base layer encoding module 410 further comprises the overlap transform unit 412, the inverse overlap transform unit 418 and the loop filter 419 and the second enhancement encoding module 430 further comprises the overlap transform unit 431. Therefore, a detailed explanation for common elements will be omitted here.

Referring to FIG. 4, in the second base layer encoding module 410, the overlap transform unit 412 determines operating conditions for performing overlap transform in response to the quantization parameter $2^{N-8}QP_8$ of the base layer and performs the overlap transform on the residue image according to the determined operating conditions. The residue image provided from the overlap transform unit 412 is transferred to the DCT unit 413.

The inverse overlap transform unit 418 determines operating conditions for performing inverse overlap transform in response to the quantization parameter $2^{N-8}QP_8$ of the base layer and performs the inverse overlap transform on the restoration image according to the determined operating conditions. The restoration image provided from the inverse overlap transform unit 418 is transferred to the loop filter 419.

The loop filter 419 determines operating conditions for performing loop filtering in response to the quantization parameter $2^{N-8}QP_8$ of the base layer and performs the loop filtering on the restoration image according to the determined operating conditions. The restoration image provided from the loop filter 419 is transferred to the addition unit 420.

By performing the processes of overlap transform and loop filtering in the second base layer encoding module 410, the quality of 8-bit restoration image may be improved while maintaining the compatibility with the general video encoding apparatus.

In the second enhancement layer encoding module 430, the overlap transform unit 431 determines operating conditions for performing overlap transform in response to the extended quantization parameter $QP_N$ of the enhancement layer and performs the overlap transform on the residue image according to the determined operating conditions. The residue image provided from the overlap transform unit 431 is transferred to the DCT unit 432.

By performing the process of overlap transform in the second enhancement layer encoding module 430, the quality of N-bit restoration image may be improved.

Figure 5:
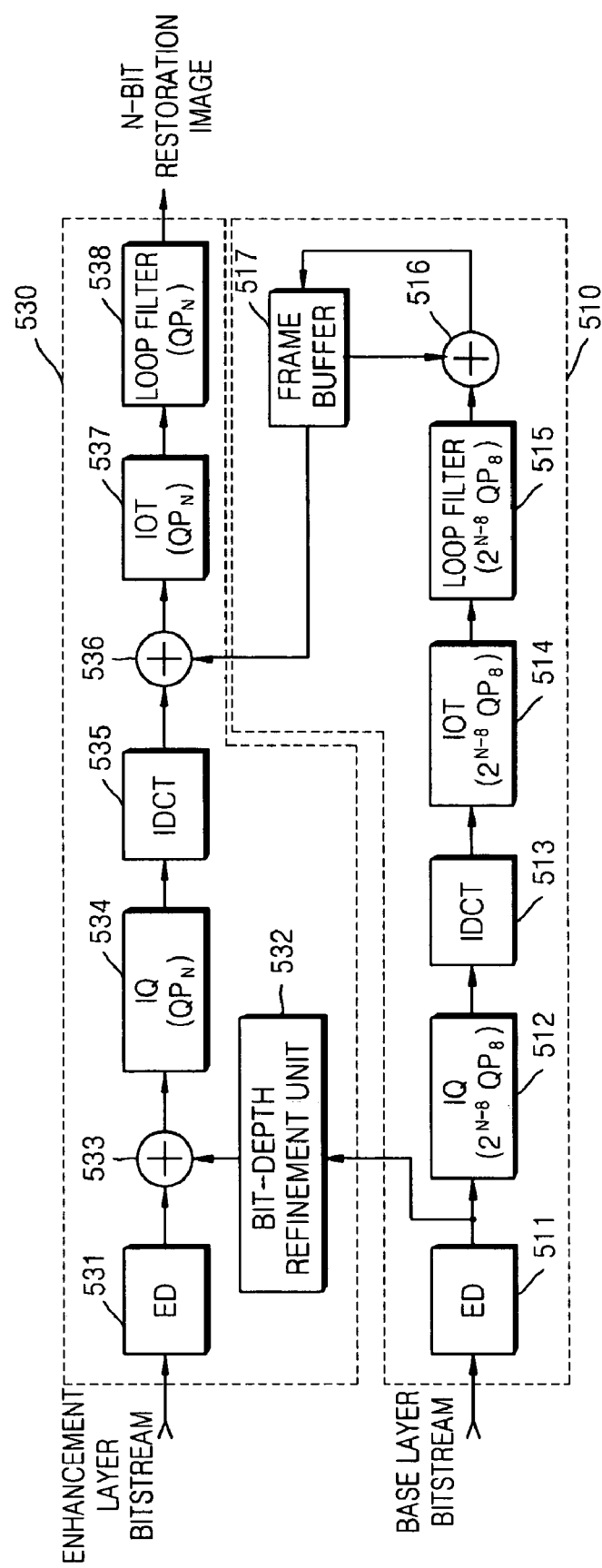
FIG. 5 is a block diagram illustrating a video decoding apparatus according to another embodiment of the present invention.

FIG. 5 is a block diagram illustrating a video decoding apparatus according to another embodiment of the present invention. The video decoding apparatus may include a second base layer decoding module 510 and a second enhancement layer decoding module 530, and corresponds to the video encoding apparatus illustrated in FIG. 4. The second base layer decoding module 510 may include an entropy decoding unit 511, an inverse quantization unit 512, an inverse DCT unit 513, an inverse overlap transform unit 514, a loop filter 515, an addition unit 516, and a frame buffer 517. The second enhancement layer decoding module 530 may include an entropy decoding unit 531, a bit-depth refinement unit 532, an addition unit 533, an inverse quantization unit 534, an inverse DCT unit 535, an addition unit 536, an inverse overlap transform unit 537 and a loop filter 538. Each element of the second base layer decoding module 510 and the second enhancement layer decoding module 530 can be implemented as at least one processor (not shown). Alternatively, the second base layer decoding module 510 and the second enhancement layer decoding module 530 may be integrated in order to implement one processor (not shown). The video decoding apparatus of FIG. 5 and the video decoding apparatus of FIG. 3A have the same structure, except that the second base layer decoding module 510 further comprises the inverse overlap transform unit 514 and the loop filter 515 and the second enhancement decoding module 530 further comprises the inverse overlap transform unit 537 and the loop filter 538. Therefore, a detailed explanation for common elements will be omitted here.

Referring to FIG. 5, in the second base layer decoding module 510, the inverse overlap transform unit 514 performs inverse overlap transform on the restoration image in response to the quantization parameter $2^{N-8}QP_8$ of the base layer by referring the header information of the bitstream. The restoration image provided from the inverse overlap transform unit 514 is transferred to the loop filter 515.

The loop filter 515 performs loop filtering on the restoration image in response to the quantization parameter $2^{N-8}QP_8$ of the base layer by referring the header information of the bitstream. The restoration image provided from the loop filter 515 is transferred to the addition unit 516.

By performing the processes of overlap transform and loop filtering in the second base layer decoding module 510, the quality of either 8-bit restoration image or N-bit reference image may be improved.

In the second enhancement layer decoding module 530, the inverse overlap transform unit 537 performs inverse overlap transform on the N-bit restoration image in response to the extended quantization parameter $QP_N$ of the enhancement layer by referring the header information of the bitstream. The N-bit restoration image provided from the inverse overlap transform unit 537 is transferred to the loop filter 538.

The loop filter 538 determines operating conditions for performing loop filtering in response to the extended quantization parameter $QP_N$ of the enhancement layer and performs the loop filtering on the N-bit restoration image according to the determined operating conditions so as to improve the image quality. Meanwhile, since the restoration image of the base layer is used in an encoding loop of the base layer encoding module 410, the filtering result of the enhancement layer has no influence on the encoding loop. Accordingly, the loop filter 538 may be denoted as a post filter. The loop filter 538 may be the same as the loop filter 515 of the second base layer decoding module 510 or another filter may be used. Though the identical loop filters are used, their operation conditions may be different.

By performing the processes of inverse overlap transform and loop filtering in the second enhancement layer decoding module 530, the quality of the final N-bit restoration image may be improved.

In addition to the quantization parameter, a coded block pattern (CBP), a sub-block coded pattern (SBLKPAT) and a DCT mode may be used as encoding conditions for determining the operating conditions in the processes of overlap transform and loop filtering. Similar to the encoding conditions, the above may be used as decoding conditions for determining the operating conditions in the process of loop filtering. The process of loop filtering has been widely used in general video codecs such as H.263, H.264 or VC-1, and the process of overlay transform has been widely used in VC-1, etc.

Figure 6:
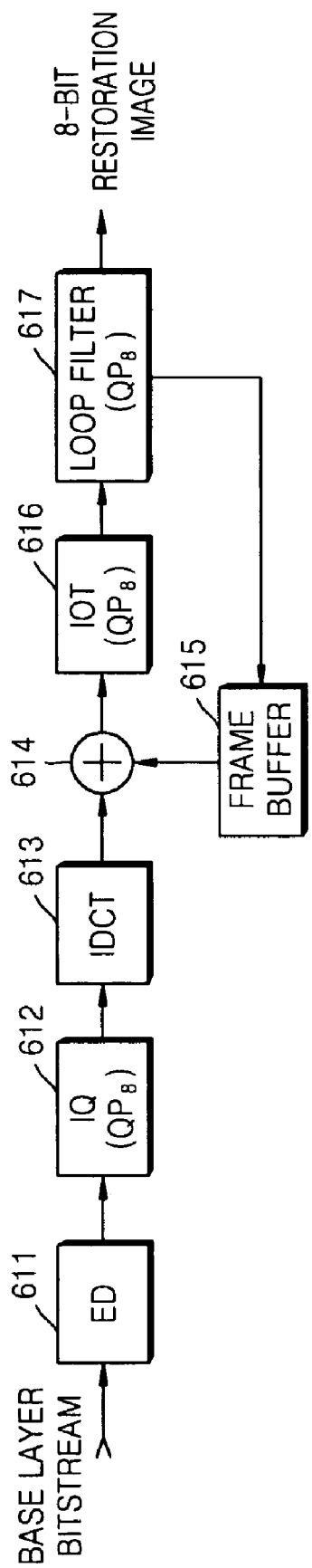
FIG. 6 is a block diagram illustrating a general video decoding apparatus, to which a scalable bitstream generated by the apparatus of FIG. 4 is input.

FIG. 6 is a block diagram illustrating a general video decoding apparatus, to which a scalable bitstream generated by the apparatus of FIG. 4 is input. The general video decoding apparatus includes an entropy decoding unit 611, an inverse quantization unit 612, an inverse DCT unit 613, an addition unit 614, a frame buffer 615, an inverse overlap transform unit 616 and a loop filter 617. The general video decoding apparatus of FIG. 6 has the same structure as the second base layer decoding module 510 illustrated in FIG. 5, except for an inverse quantization parameter used during an inverse quantization process, and positions of the inverse overlap transform unit 616 and the loop filter 617.

Referring to FIG. 6, the inverse quantization 612 restores the transform coefficients (coef$_8$) from the base layer bitstream using the base quantization parameter QP$_8$.

The inverse overlap transform unit 616 performs inverse overlap transform on the 8-bit restoration image in response to the base quantization parameter QP$_8$ by referring the header information of the bitstream. The 8-bit restoration image provided from the inverse overlap transform unit 616 is transferred to the loop filter 617.

Figure 7:
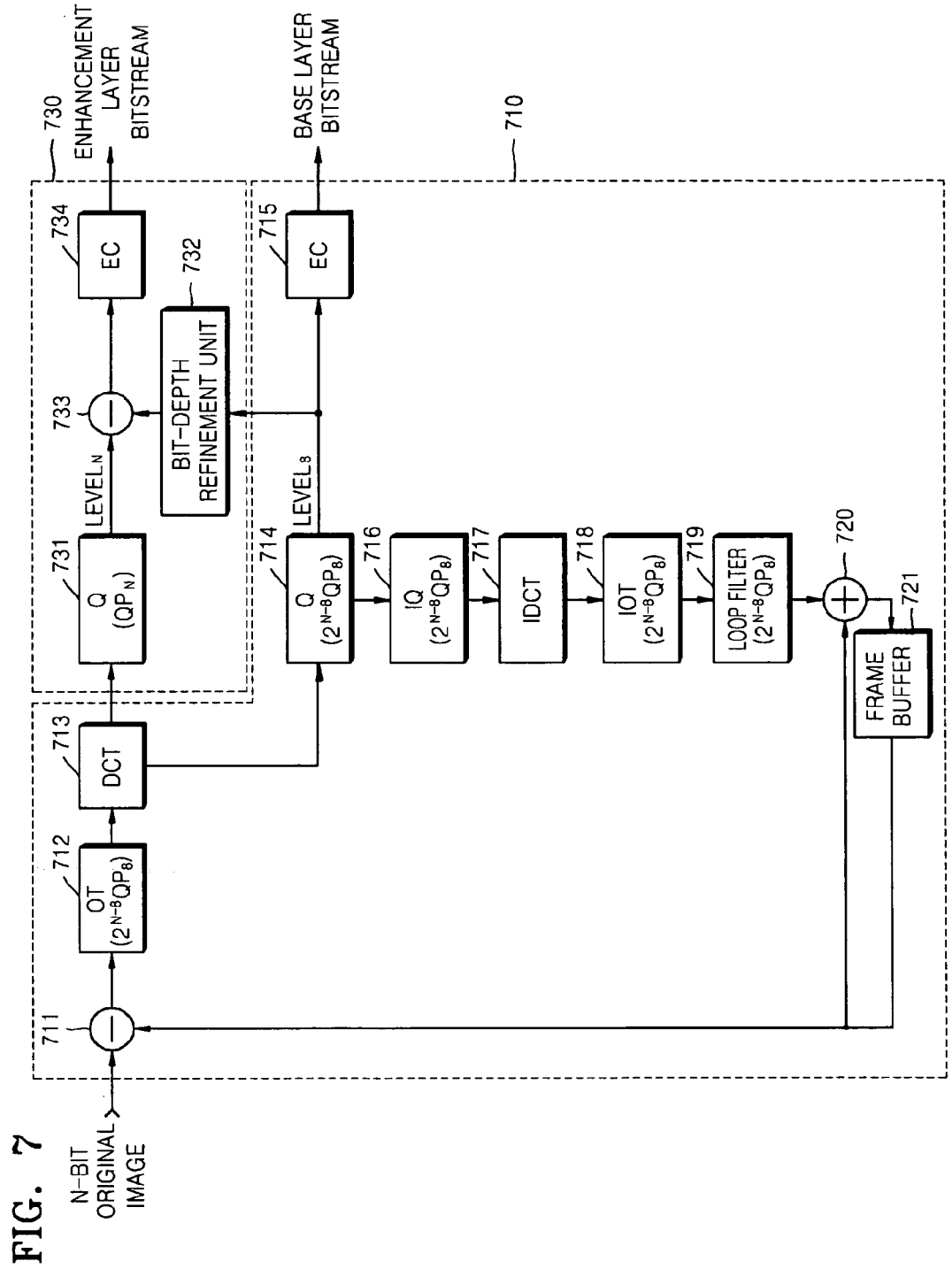
FIG. 7 is a block diagram illustrating a video encoding apparatus according to another embodiment of the present invention.

The loop filter 617 performs loop filtering on the 8-bit restoration image in response to the base quantization parameter QP$_8$ by referring the header information of the bitstream so as to improve the quality of the 8-bit restoration image. The 8-bit restoration image having an improved image quality is stored in the frame buffer 615 as a reference image for the next frame FIG. 7 is a block diagram illustrating a video encoding apparatus according to another embodiment of the present invention. The video encoding apparatus may include a third base layer encoding module 710 and a third enhancement layer encoding module 730. The third base layer encoding module 710 may include a subtraction unit 711, an overlap transform unit 712, a DCT unit 713, a quantization unit 714, an entropy encoding unit 715, an inverse quantization unit 716, an inverse DCT unit 717, an inverse overlap transform unit 718, a loop filter 719, an addition unit 720, and a frame buffer 721. The third enhancement layer encoding module 730 may include a quantization unit 731, a bit-depth refinement unit 732, a subtraction unit 733, and an entropy encoding unit 734. Each element of the third base layer encoding module 710 and the third enhancement layer encoding module 730 can be implemented as at least one processor (not shown) by integrating each module into at least one module. Alternatively, the third base layer encoding module 710 and the third enhancement layer encoding module 730 may be integrated in order to implement one processor (not shown). The video encoding apparatus of FIG. 7 and the video encoding apparatus of FIG. 2 have the same structure, except that the processes of overlap transform and loop filtering repeatedly performed in the third base layer encoding module 710 and the third enhancement layer encoding module 730, respectively are modified as common processes of overlap transform and loop filtering for both the base layer and the enhancement layer.

Referring to FIG. 7, in the third base layer encoding module 710, the overlap transform unit 712 determines operating conditions for performing overlap transform in response to the quantization parameter $2^{N-8}$QP$_8$ of the base layer and performs the overlap transform on the residue image according to the determined operating conditions. The residue image provided from the overlap transform unit 712 is transferred to the DCT unit 713.

The DCT unit 713 obtains transform coefficients from the overlap transformed residue image and provides the obtained transform coefficients to both the quantization unit 714 of the third base layer encoding module 710 and the quantization unit 731 of the third enhancement layer encoding module 730.

The inverse overlap transform unit 718 determines operating conditions for performing inverse overlap transform in response to the quantization parameter $2^{N-8}$QP$_8$ of the base layer and performs the inverse overlap transform on the restoration image according to the determined operating conditions. The restoration image provided from the inverse overlap transform unit 718 is transferred to the loop filter 719.

The loop filter 719 determines operating conditions for performing loop filtering in response to the quantization parameter $2^{N-8}$QP$_8$ of the base layer and performs the loop filtering on the restoration image according to the determined operating conditions. The restoration image provided from the loop filter 719 is transferred to the addition unit 720.

By performing the processes of overlap transform and loop filtering in the third base layer encoding module 710, the quality of 8-bit restoration image may be improved while maintaining the compatibility with the general video encoding apparatus. Also, the quality of N-bit restoration image may be improved while reducing the complexity of hardware implementation, since the third enhancement layer encoding module 730 shares the processes of overlap transform and DCT with the third base layer encoding module 710.

Figure 8:
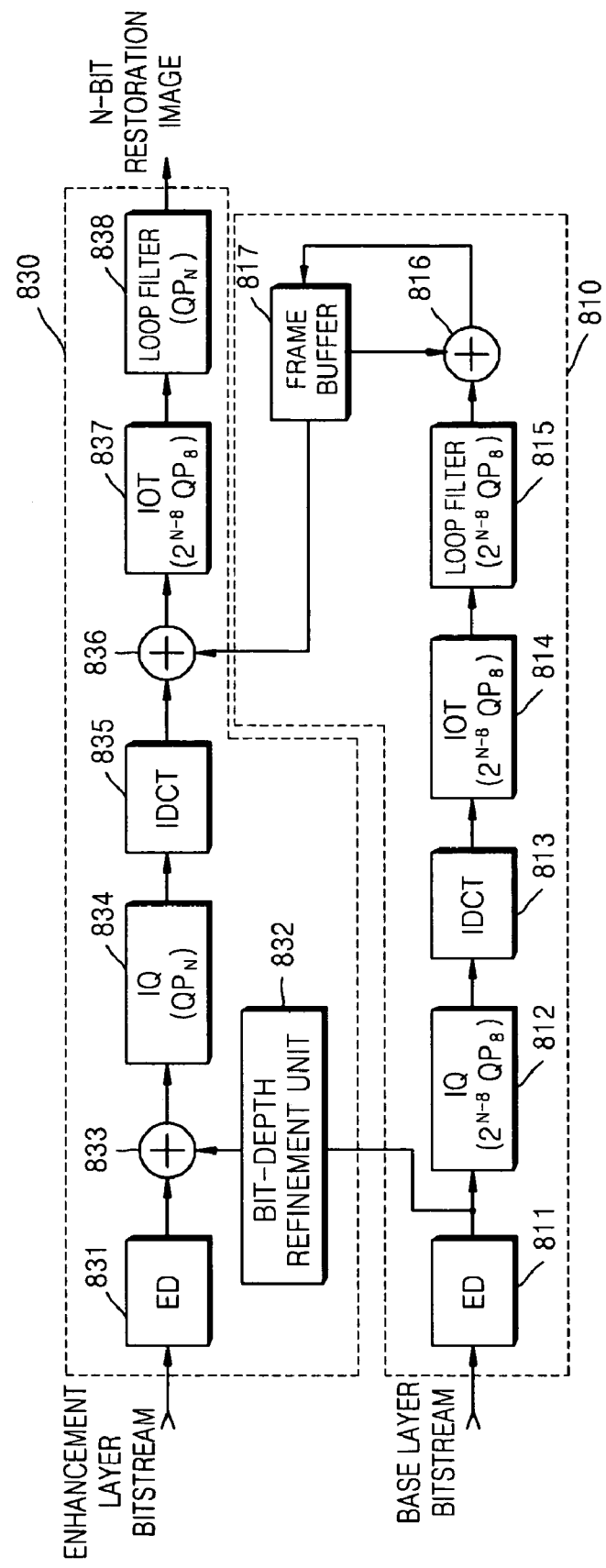
FIGS. 8 through 10 are block diagrams illustrating a video decoding apparatus according to example embodiments of the present invention.

FIG. 8 is a block diagram illustrating a video decoding apparatus according to example embodiments of the present invention. The video decoding apparatus may include a third base layer decoding module 810 and a third enhancement layer decoding module 830, and corresponds to the video encoding apparatus illustrated in FIG. 7. The third base layer decoding module 810 may include an entropy decoding unit 811, an inverse quantization unit 812, an inverse DCT unit 813, an inverse overlap transform unit 814, a loop filter 815, an addition unit 816, and a frame buffer 817. The third enhancement layer decoding module 830 may include an entropy decoding unit 831, a bit-depth refinement unit 832, an addition unit 833, an inverse quantization unit 834, an inverse DCT unit 835, an addition unit 836, an inverse overlap transform unit 837 and a loop filter 838. Each element of the third base layer decoding module 810 and the third enhancement layer decoding module 830 can be implemented as at least one processor (not shown). Alternatively, the third base layer decoding module 810 and the third enhancement layer decoding module 830 may be integrated in order to implement one processor (not shown). The video decoding apparatus of FIG. 8 and the video decoding apparatus of FIG. 5 have the same structure, except that the operation conditions of the inverse overlap transform unit 837 in the third enhancement layer decoding module 830 are determined using the quantization parameter $2^{N-8}$QP$_8$ of the base layer. Therefore, a detailed explanation for common elements will be omitted here.

Referring to FIG. 8, in the third enhancement layer decoding module 830, the inverse overlap transform unit 837 performs inverse overlap transform on the N-bit restoration image in response to the quantization parameter $2^{N-8}$QP$_8$ of the base layer by referring the header information of the bitstream. The N-bit restoration image provided from the inverse overlap transform unit 837 is transferred to the loop filter 838.

The loop filter 838 determines operating conditions for performing loop filtering in response to the extended quantization parameter QP$_N$ of the enhancement layer and performs the loop filtering on the N-bit restoration image according to the determined operating conditions so as to improve the quality of the N-bit restoration image.

In FIG. 8, the third enhancement layer decoding module 830 performs the process of inverse overlap transform under the substantially same conditions as the third base layer decoding module 810.

Figure 9:
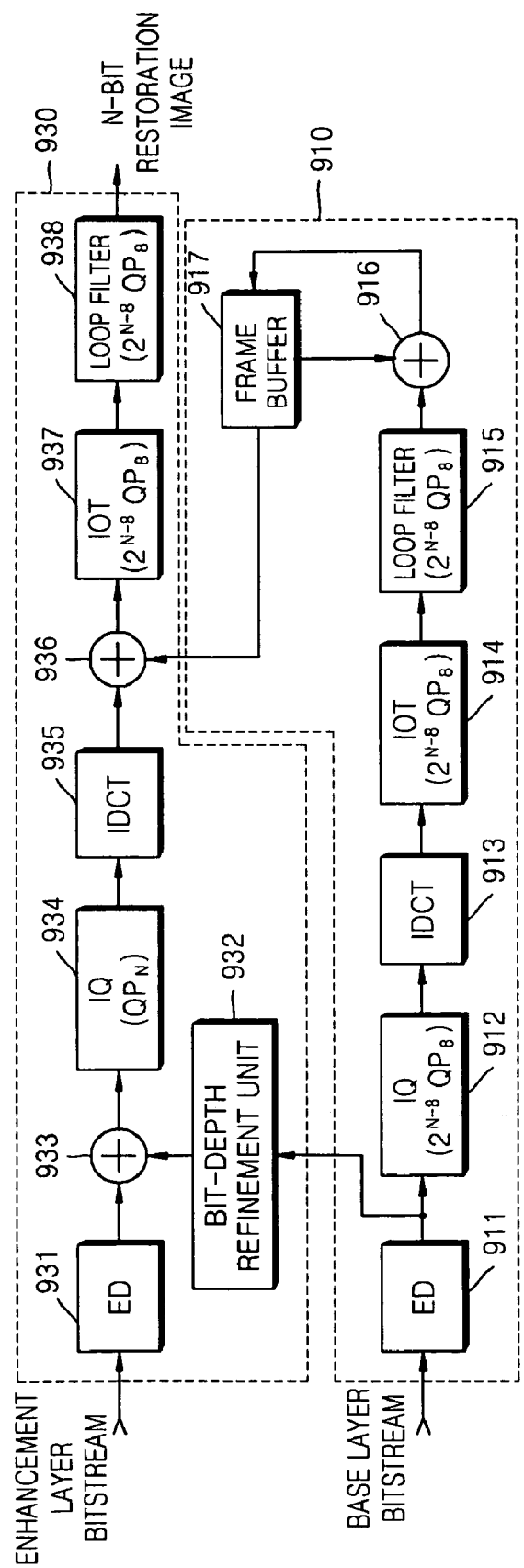

FIG. 9 is a block diagram illustrating a video decoding apparatus according to example embodiments of the present invention. The video decoding apparatus may include a fourth base layer decoding module 910 and a fourth enhancement layer decoding module 930, and corresponds to the video encoding apparatus illustrated in FIG. 7. The fourth base layer decoding module 910 may include an entropy decoding unit 911, an inverse quantization unit 912, an inverse DCT unit 913, an inverse overlap transform unit 914, a loop filter 915, an addition unit 916, and a frame buffer 917. The fourth enhancement layer decoding module 930 may include an entropy decoding unit 931, a bit-depth refinement unit 932, an addition unit 933, an inverse quantization unit 934, an inverse DCT unit 935, an addition unit 936, an inverse overlap transform unit 937 and a loop filter 938. Each element of the fourth base layer decoding module 910 and the fourth enhancement layer decoding module 930 can be implemented as at least one processor (not shown). Alternatively, the fourth base layer decoding module 910 and the fourth enhancement layer decoding module 930 may be integrated in order to implement one processor (not shown). The video decoding apparatus of FIG. 9 and the video decoding apparatus of FIG. 8 have the same structure, except that the operation conditions of the loop filter 938 in the fourth enhancement layer decoding module 930 are determined using the quantization parameter $2^{N-8}QP_8$ of the base layer. Therefore, a detailed explanation for common elements will be omitted here.

Referring to FIG. 9, in the fourth enhancement layer decoding module 930, the inverse overlap transform unit 937 performs inverse overlap transform on the N-bit restoration image in response to the quantization parameter $2^{N-8}QP_8$ of the base layer by referring the header information of the bitstream. The N-bit restoration image provided from the inverse overlap transform unit 937 is transferred to the loop filter 938.

The loop filter 938 determines operating conditions for performing loop filtering in response to the quantization parameter $2^{N-8}QP_8$ of the base layer and performs the loop filtering on the N-bit restoration image according to the determined operating conditions so as to improve the quality of the N-bit restoration image.

In FIG. 9, the fourth enhancement layer decoding module 930 performs the processes of inverse overlap transform and loop filtering under the substantially same conditions as the fourth base layer decoding module 910.

Figure 10:
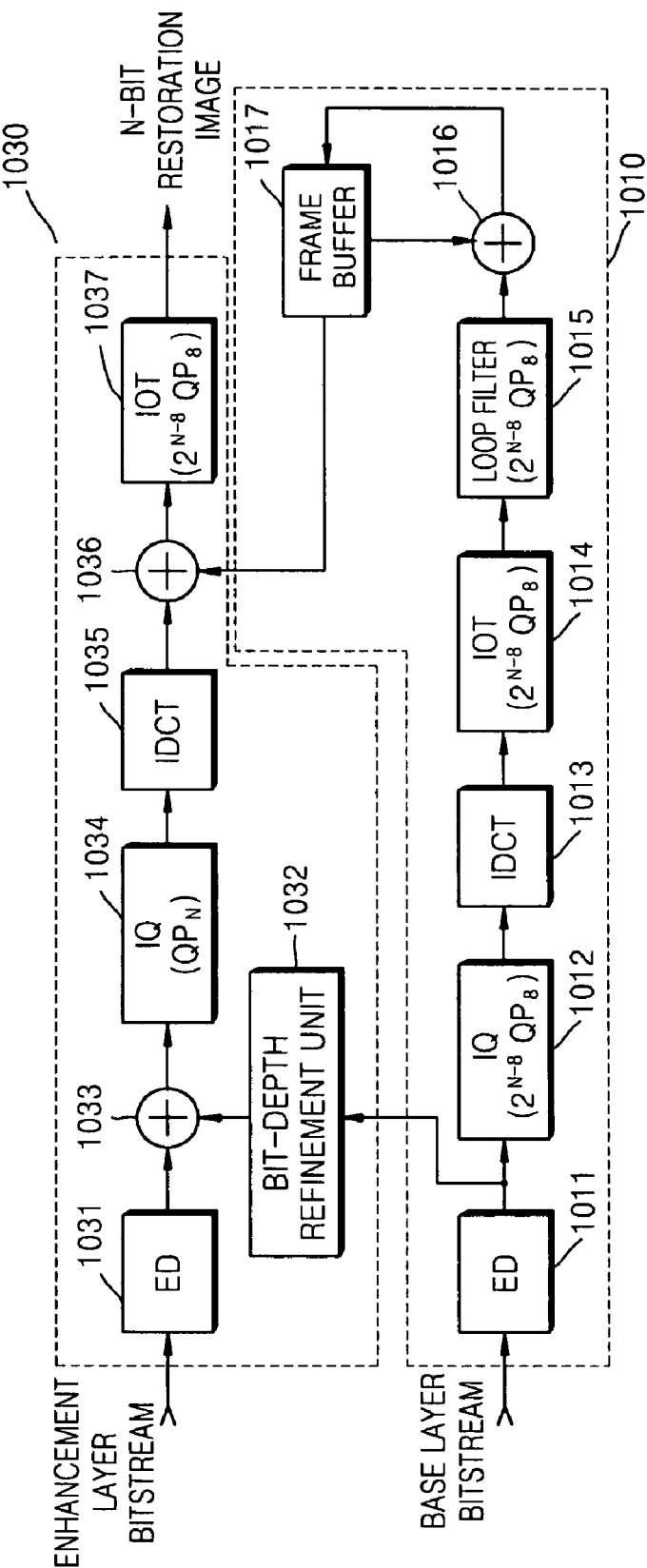

FIG. 10 is a block diagram illustrating a video decoding apparatus according to example embodiments of the present invention. The video decoding apparatus may include a fifth base layer decoding module 1010 and a fifth enhancement layer decoding module 1030, and corresponds to the video encoding apparatus illustrated in FIG. 7. The fifth base layer decoding module 1010 may include an entropy decoding unit 1011, an inverse quantization unit 1012, an inverse DCT unit 1013, an inverse overlap transform unit 1014, a loop filter 1015, an addition unit 1016, and a frame buffer 1017. The fifth enhancement layer decoding module 1030 may include an entropy decoding unit 1031, a bit-depth refinement unit 1032, an addition unit 1033, an inverse quantization unit 1034, an inverse DCT unit 1035, an addition unit 1036 and an inverse overlap transform unit 1037. Each element of the fifth base layer decoding module 1010 and the fifth enhancement layer decoding module 1030 can be implemented as at least one processor (not shown). Alternatively, the fifth base layer decoding module 1010 and the fifth enhancement layer decoding module 1030 may be integrated in order to implement one processor (not shown). The video decoding apparatus of FIG. 10 and the video decoding apparatus of FIG. 9 have the same structure, except that the fifth enhancement layer decoding module 1030 does not perform the process of loop filtering. Therefore, a detailed explanation for common elements will be omitted here.

Referring to FIG. 10, in the fifth enhancement layer decoding module 1030, the inverse overlap transform unit 1037 performs inverse overlap transform on the N-bit restoration image in response to the quantization parameter $2^{N-8}QP_8$ of the base layer by referring the header information of the bitstream so as to improve the quality of the N-bit restoration image.

In FIG. 10, the fifth enhancement layer decoding module 1030 performs the process of inverse overlap transform under the substantially same conditions as the fifth base layer decoding module 1010.

Meanwhile, a block diagram illustrating a general video decoding apparatus, to which a scalable bitstream generated by the apparatus of FIG. 7 is input, is shown in FIG. 6.

Figure 11:
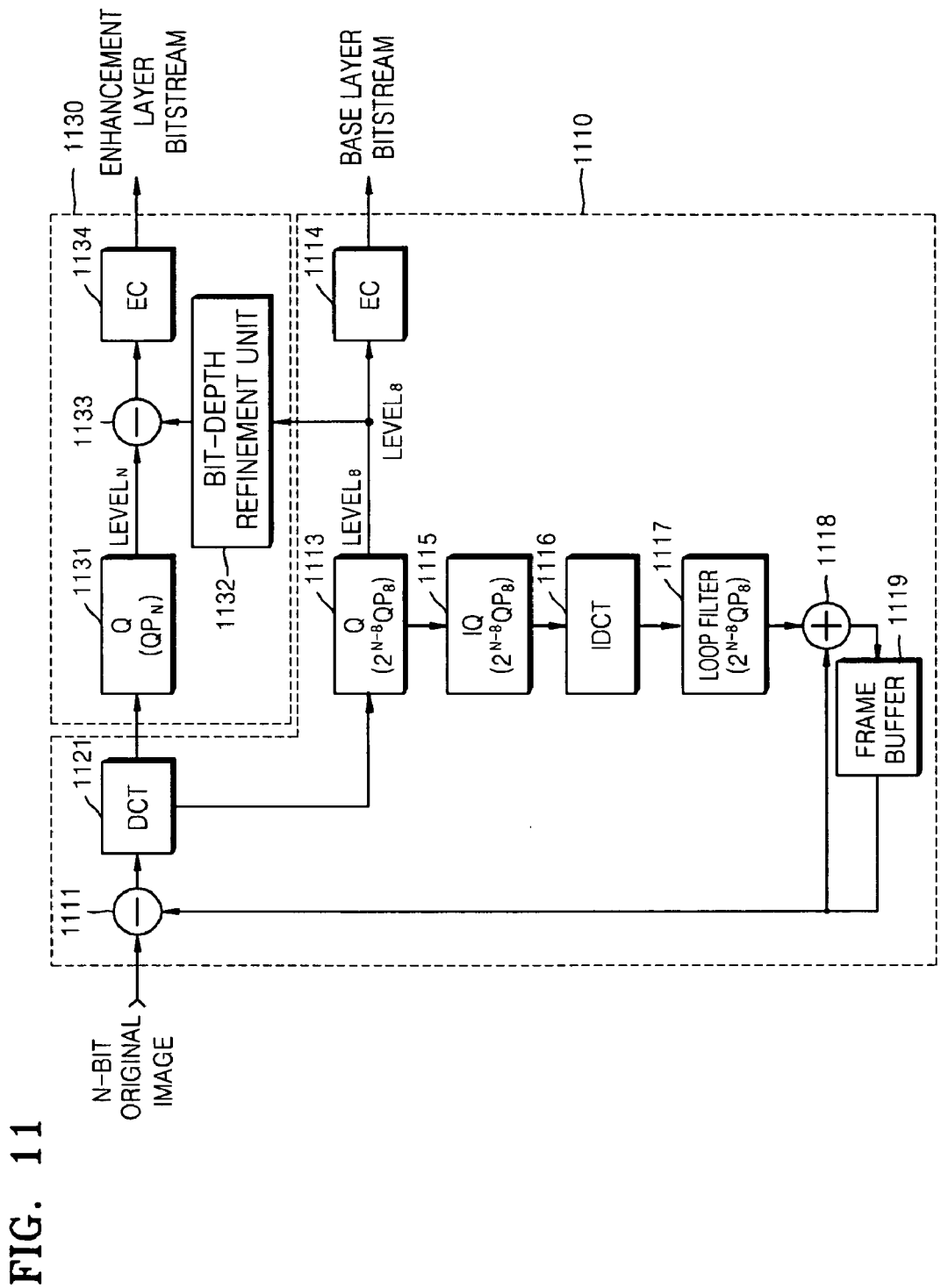
FIG. 11 is a block diagram illustrating a video encoding apparatus according to another embodiment of the present invention.

FIG. 11 is a block diagram illustrating a video encoding apparatus according to another embodiment of the present invention. The video encoding apparatus may include a fourth base layer encoding module 1110 and a fourth enhancement layer encoding module 1130. The fourth base layer encoding module 1110 may include a subtraction unit 1111, a DCT unit 1112, a quantization unit 1113, an entropy encoding unit 1114, an inverse quantization unit 1115, an inverse DCT unit 1116, a loop filter 1117, an addition unit 1118, and a frame buffer 1119. The fourth enhancement layer encoding module 1130 may include a quantization unit 1131, a bit-depth refinement unit 1132, a subtraction unit 1133, and an entropy encoding unit 1134. Each element of the fourth base layer encoding module 1110 and the fourth enhancement layer encoding module 1130 can be implemented as at least one processor (not shown) by integrating each module into at least one module. Alternatively, the fourth base layer encoding module 1110 and the fourth enhancement layer encoding module 1130 may be integrated in order to implement one processor (not shown). The video encoding apparatus of FIG. 11 and the video encoding apparatus of FIG. 7 have the same structure, except that the fourth base layer encoding module 1110 does not perform the process of overlap transform. Therefore, a detailed explanation for common elements will be omitted here.

Referring to FIG. 11, in the fourth base layer encoding module 1110, the DCT unit 1112 obtains transform coefficients from residue image provided from the subtraction unit 1111 and provides the obtained transform coefficients to both the quantization unit 1113 of the fourth base layer encoding module 1110 and the quantization unit 1131 of the fourth enhancement layer encoding module 730.

The loop filter 1117 determines operating conditions for performing loop filtering in response to the quantization parameter $2^{N-8}QP_8$ of the base layer and performs the loop filtering on the restoration image provided from the inverse DCT unit 1116, according to the determined operating conditions. The restoration image provided from the loop filter 1117 is transferred to the addition unit 1118.

Figure 12:
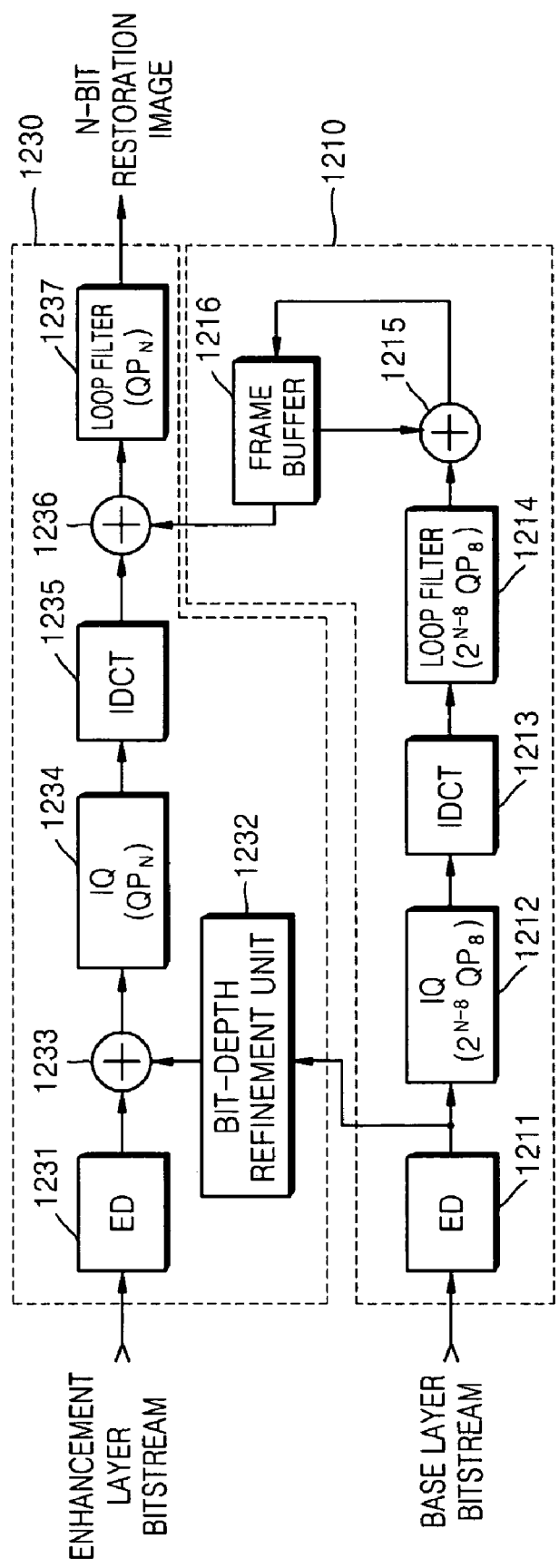
FIGS. 12 through 13 are block diagrams illustrating a video decoding apparatus according to example embodiments of the present invention.

FIG. 12 is a block diagram illustrating a video decoding apparatus according to example embodiments of the present invention. The video decoding apparatus may include a sixth base layer decoding module 1210 and a sixth enhancement layer decoding module 1230, and corresponds to the video encoding apparatus illustrated in FIG. 11. The sixth base layer decoding module 1210 may include an entropy decoding unit 1211, an inverse quantization unit 1212, an inverse DCT unit 1213, a loop filter 1214, an addition unit 1215, and a frame buffer 1216. The sixth enhancement layer decoding module 1230 may include an entropy decoding unit 1231, a bit-depth refinement unit 1232, an addition unit 1233, an inverse quantization unit 1234, an inverse DCT unit 1235, an addition unit 1236 and a loop filter 1237. Each element of the sixth base layer decoding module 1210 and the sixth enhancement layer decoding module 1230 can be implemented as at least one processor (not shown). Alternatively, the sixth base layer decoding module 1210 and the sixth enhancement layer decoding module 1230 may be integrated in order to implement one processor (not shown). The video decoding apparatus of FIG. 12 and the video decoding apparatus of FIG. 8 have the same structure, except that both the sixth base layer decoding module 1210 and the sixth enhancement layer decoding module 1230 do not perform the process of overlap transform. Therefore, a detailed explanation for common elements will be omitted here.

Referring to FIG. 12, in the sixth base layer decoding module 1210, the loop filter 1214 determines operating conditions for performing loop filtering in response to the quantization parameter $2^{N-8}QP_8$ of the base layer and performs the loop filtering on the restoration image provided from the inverse DCT unit 1213, according to the determined operating conditions. The loop-filtered restoration image is provided to the addition unit 1215.

In the sixth enhancement layer decoding module 1230, the loop filter 1237 determines operating conditions for performing loop filtering in response to the extended quantization parameter $QP_N$ of the enhancement layer and performs the loop filtering on the restoration image provided from the addition unit 1236, according to the determined operating conditions so as to improve the quality of the N-bit restoration image.

Figure 13:
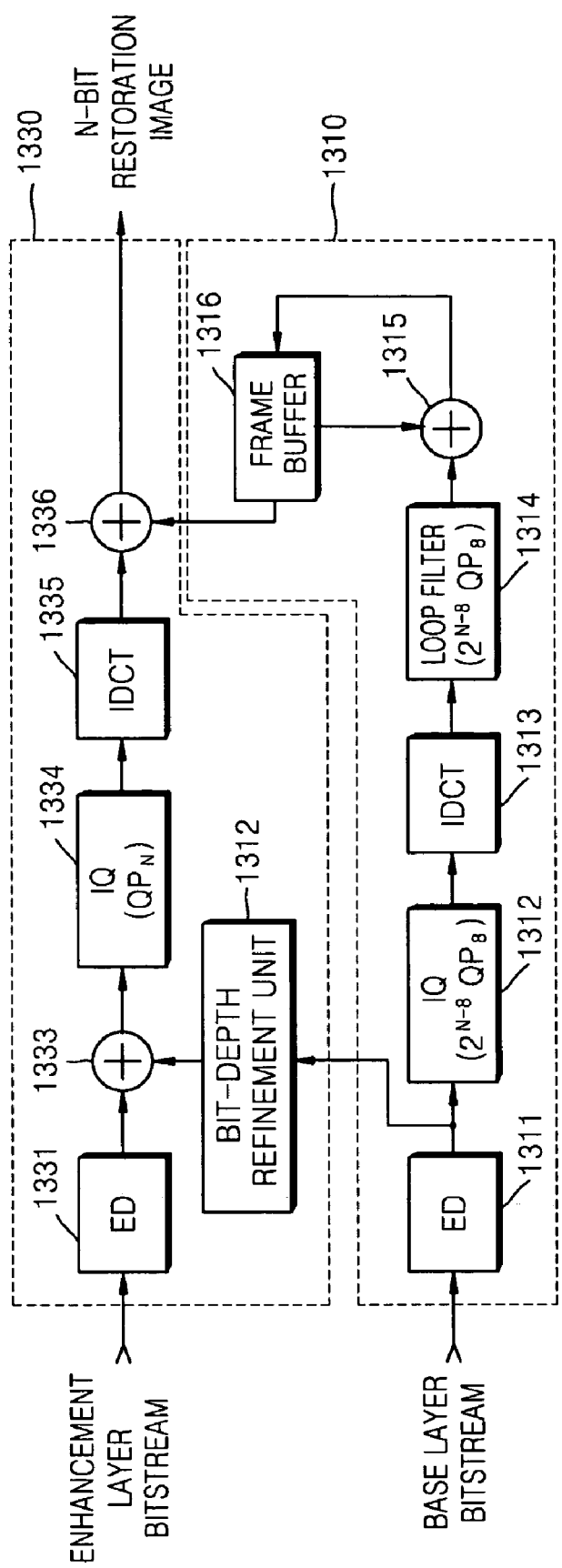

FIG. 13 is a block diagram illustrating a video decoding apparatus according to example embodiments of the present invention. The video decoding apparatus may include a seventh base layer decoding module 1310 and a seventh enhancement layer decoding module 1330, and corresponds to the video encoding apparatus illustrated in FIG. 11. The seventh base layer decoding module 1310 may include an entropy decoding unit 1311, an inverse quantization unit 1312, an inverse DCT unit 1313, a loop filter 1314, an addition unit 1315, and a frame buffer 1316. The seventh enhancement layer decoding module 1330 may include an entropy decoding unit 1331, a bit-depth refinement unit 1332, an addition unit 1333, an inverse quantization unit 1334, an inverse DCT unit 1335 and an addition unit 1336. Each element of the seventh base layer decoding module 1310 and the seventh enhancement layer decoding module 1330 can be implemented as at least one processor (not shown). Alternatively, the seventh base layer decoding module 1310 and the seventh enhancement layer decoding module 1330 may be integrated in order to implement one processor (not shown). The video decoding apparatus of FIG. 13 and the video decoding apparatus of FIG. 12 have the same structure, except that the seventh enhancement layer decoding module 1330 do not perform the process of loop filtering. Therefore, a detailed explanation for common elements will be omitted here.

Referring to FIG. 13, in the seventh enhancement layer decoding module 1330, the addition unit 1336 adds the restoration image provided from the inverse DCT unit 1335 to the reference image stored in the frame buffer 1316 to generate the N-bit restoration image having an improved image quality.

Figure 14:
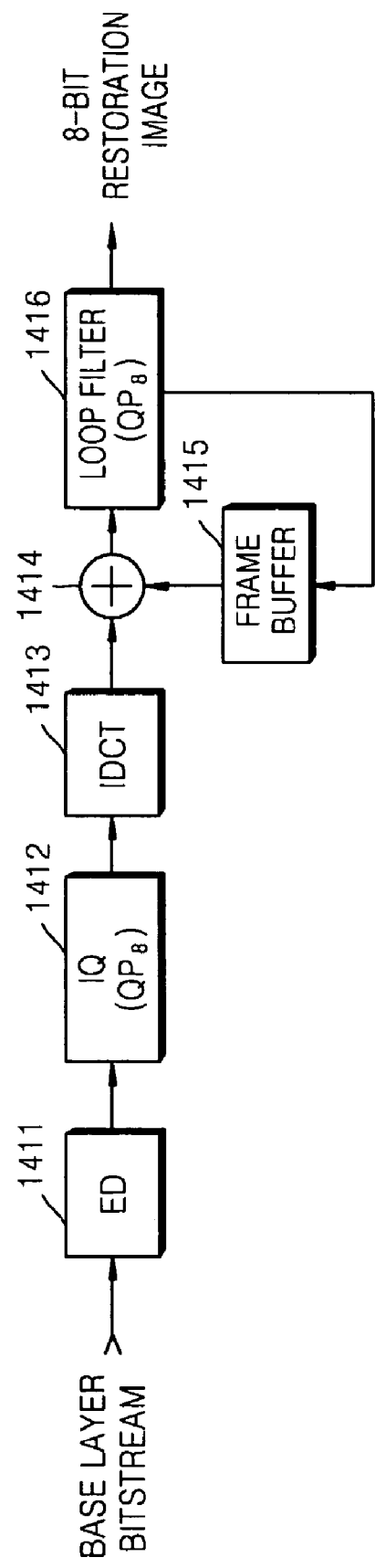
FIG. 14 is a block diagram illustrating a general video decoding apparatus, to which a scalable bitstream generated by the apparatus of FIG. 11 is input.

FIG. 14 is a block diagram illustrating a general video decoding apparatus, to which a scalable bitstream generated by the apparatus of FIG. 11 is input. The general video decoding apparatus includes an entropy decoding unit 1411, an inverse quantization unit 1412, an inverse DCT unit 1413, an addition unit 1414, a frame buffer 1415 and a loop filter 1416. The video decoding apparatus of FIG. 14 and the video decoding apparatus of FIG. 6 have the same structure, except that the video decoding apparatus of FIG. 14 does not perform the process of overlap transform. Therefore, a detailed explanation for common elements will be omitted here.

Referring to FIG. 14, the loop filter 1416 determines operating conditions for performing loop filtering in response to the base quantization parameter $QP_8$ of the base layer and performs the loop filtering on the restoration image provided from the addition unit 1414, according to the determined operating conditions so as to improve the quality of the 8-bit restoration image. The 8-bit restoration image having an improved image quality is stored in the frame buffer 1415 as the reference image for the next frame.

The video codec applied in the embodiments described above indicates an MC-DCT video codec which is widely used in MPEG-2, MPEG-4, H.264, and the like, but the present invention is not limited to this, and according to applications, modification or variation can be made. Meanwhile, since the applied video codec is widely known to those of ordinary skill in the art, a detailed explanation of the operations of known elements, except those elements which are modified or added by the present invention, are omitted here.

In the embodiments described above, it is explained that the structure of a scalable bitstream supports two different codecs in which at least one of the bit-depth and video format of one codec is different from that of the other codec, based on embodiments formed by one base layer bitstream and one enhancement layer bitstream. However, by placing a plurality of enhancement layer bitstreams, it is also possible to support more than two codecs. Also, in the present embodiments, an example in which the base bit-depth value is greater than the extended bit-depth value is explained. However, even when the changing direction of the bit-depth is different, that is, when the base bit-depth value is less than the extended bit-depth value, designs can be varied in a number of ways. Also, although additional quantization information such as a refined quantization parameter (R) is assigned in each picture level in the present embodiments, a refined quantization parameter (R) can be assigned in each slice level, each macroblock level, or each block level when necessary.

As described above, in order to provide a new video codec guaranteeing forward compatibility as well as backward compatibility, a video encoding apparatus according to the present invention generates a scalable bitstream formed with a base layer bitstream and an enhancement layer bitstream. A conventional basic decoder which receives the scalable bitstream performs decoding by using a base layer bitstream obtained from the scalable bitstream. A video decoding apparatus according to the present invention performs decoding by using both the base layer bitstream and the enhancement layer bitstream. In this way, the video codec according to the present invention can harmonize and thereby coexist with conventional video codecs. Accordingly, the present invention has an advantage in that a conventional window media video (WMV) codec or a VC-1 codec can be used together with a video codec supporting a new bit-depth.

Since the video codec according to an embodiment of the present invention provides forward compatibility as described above, the present invention can be employed in conventional basic video codes as well as improved video codecs mounted on wired or wireless electronic devises, such as mobile phones, DVD players, portable music players, or car audio systems. In this way, the present invention can be applied to a variety of video codecs irrespective of supported bit-depth or video formats.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A video encoding method of generating a scalable bitstream supporting at least two bit-depths with forward compatibility, the method comprising:
   generating a base layer bitstream including a base quantized level and a base quantization parameter corresponding to a base bit-depth; and
   generating, performed by at least one processing device, an enhancement layer bitstream including a residue between an extended quantized level and a refined quantized level that is obtained from the base quantized level, and additional quantization information for refining the difference between an extended bit-depth and the base bit-depth,
   wherein a process for improving image quality is performed on at least one of a base layer and an enhancement layer.

2. The method of claim 1, wherein the process for improving image quality corresponds to at least one of overlap transform and loop filtering.

3. The method of claim 1, wherein processes of overlap transform and loop filtering are performed on the base layer and a process of overlap transform is performed on the enhancement layer.

4. The method of claim 3, wherein the processes of overlap transform and loop filtering corresponding to encoding conditions of the base layer is performed on the base layer, and the process of overlap transform corresponding to encoding conditions of the enhancement layer is performed on the enhancement layer.

5. The method of claim 3, wherein the process of loop filtering corresponding to encoding conditions of the base layer is performed on the base layer, and the process of overlap transform corresponding to encoding conditions of the base layer is performed on both the base layer and the enhancement layer.

6. The method of claim 1, wherein a process of loop filtering corresponding to encoding conditions of the base layer is performed on the base layer.

7. The method of claim 1, wherein the scalable bitstream further includes an enhancement layer identifier.

8. The method of claim 7, wherein the enhancement layer identifier is included in at least one of a sequence level, a group of pictures (GOP) level, a picture level, a macro block level, and a block level of the base layer bitstream.

9. A video encoding apparatus for generating a scalable bitstream supporting at least two bit-depths with forward compatibility, the video encoding apparatus comprising:
   a base layer encoding unit to generate a base layer bitstream including a base quantized level and a base quantization parameter corresponding to a base bit-depth; and
   an enhancement layer encoding unit to generate an enhancement layer bitstream including a residue between an extended quantized level and a refined quantized level that is obtained from the base quantized level, and additional quantization information for refining the difference between an extended bit-depth and the base bit-depth,
   wherein a process for improving image quality is performed on at least one of a base layer and an enhancement layer.

10. A video decoding method of decoding a scalable bitstream including a base layer bitstream and an enhancement layer bitstream, in which a process for improving image quality is performed on at least one of a base layer and an enhancement layer, the video decoding method comprising:
   decoding the base layer bitstream including a base quantized level and a base quantization parameter corresponding to a base bit-depth and to obtain a base restoration image; and
   decoding the enhancement layer bitstream including a residue between an extended quantized level and a refined quantized level that is obtained from the base quantized level, and additional quantization information for refining the difference between an extended bit-depth and the base bit-depth, and to obtain an extended restoration image by adding a compensated quantized level predicted from a restored base quantized level to a restored extended quantized level.

11. The method of claim 10, wherein the process for improving image quality corresponds to at least one of overlap transform and loop filtering.

12. The method of claim 10, wherein processes of overlap transform and loop filtering are performed on both the base layer and the enhancement layer.

13. The method of claim 12, wherein the processes of overlap transform and loop filtering corresponding to decoding conditions of the base layer is performed on the base layer, and the processes of overlap transform and loop filtering corresponding to decoding conditions of the enhancement layer is performed on the enhancement layer.

14. The method of claim 12, wherein the processes of overlap transform and loop filtering corresponding to decoding conditions of the base layer is performed on the base layer, and the process of overlap transform corresponding to decoding conditions of the base layer and the process of loop filtering corresponding to decoding conditions of the enhancement layer is performed on the enhancement layer.

15. The method of claim 12, wherein the processes of overlap transform and loop filtering corresponding to decoding conditions of the base layer is performed on both the base layer and the enhancement layer.

16. The method of claim 12, wherein the process of overlap transform corresponding to decoding conditions of the base layer is performed on both the base layer and the enhancement layer, and the process of loop filtering corresponding to decoding conditions of the base layer is performed on the base layer.

17. The method of claim 10, wherein the process of loop filtering corresponding to decoding conditions of the base layer is performed on the base layer, and the process of loop filtering corresponding to decoding conditions of the enhancement layer is performed on the enhancement layer.

18. The method of claim 10, wherein the process of loop filtering corresponding to decoding conditions of the base layer is performed on the base layer.

19. The method of claim 10, wherein the scalable bitstream further includes an enhancement layer identifier.

20. The method of claim 19, wherein the enhancement layer identifier is included in at least one of a sequence level, a group of pictures (GOP) level, a picture level, a macro block level, and a block level of the base layer bitstream.

21. A video decoding apparatus for decoding a scalable bitstream including a base layer bitstream and an enhancement layer bitstream, in which a process for improving image quality is performed on at least one of a base layer and an enhancement layer, the video decoding apparatus comprising:
   a base layer decoding unit to decode the base layer bitstream including a base quantized level and a base quantization parameter corresponding to a base bit-depth and to obtain a base restoration image; and
   an enhancement layer decoding unit to decode the enhancement layer bitstream including a residue between an extended quantized level and a refined quantized level that is obtained from the base quantized level, and additional quantization information for refining the difference between an extended bit-depth and the base bit-depth, and to obtain an extended restoration image by adding a compensated quantized level predicted from a restored base quantized level to a restored extended quantized level.

22. A non-transitory computer readable medium having computer readable code to implement a video encoding method of generating a scalable bitstream supporting at least two bit-depths with forward compatibility, wherein the scalable bitstream comprises:
   a base layer bitstream including a base quantized level and a base quantization parameter corresponding to a base bit-depth; and
   an enhancement layer bitstream including a residue between an extended quantized level and a refined quantized level that is obtained from the base quantized level, and additional quantization information for refining the difference between an extended bit-depth and the base bit-depth,
   wherein a process for improving image quality is performed on at least one of a base layer and an enhancement layer.

23. A non-transitory computer readable medium having computer readable code to implement a video decoding method of decoding a scalable bitstream including a base layer bitstream and an enhancement layer bitstream, in which a process for improving image quality is performed on at least one of a base layer and an enhancement layer, the video decoding method comprising:
   decoding the base layer bitstream including a base quantized level and a base quantization parameter corresponding to a base bit-depth and to obtain a base restoration image; and
   decoding the enhancement layer bitstream including a residue between an extended quantized level and a refined quantized level that is obtained from the base quantized level, and additional quantization information for refining the difference between an extended bit-depth and the base bit-depth, and to obtain an extended restoration image by adding a compensated quantized level predicted from a restored base quantized level to a restored extended quantized level.

24. The method of claim 1, wherein the additional quantization information is included in a start code of a header of the enhancement layer.

25. The method of claim 24, wherein the additional quantization information comprises at least one of enhanced video format information, bit-depth information and additional chrominance data to support a video format of the enhancement layer.

* * * * *